United States Patent [19]
Enge et al.

[11] Patent Number: 5,944,770
[45] Date of Patent: *Aug. 31, 1999

[54] METHOD AND RECEIVER USING A LOW EARTH ORBITING SATELLITE SIGNAL TO AUGMENT THE GLOBAL POSITIONING SYSTEM

[75] Inventors: Per K. Enge, Mountain View; Nicholas Charles Talbot, San Jose, both of Calif.

[73] Assignee: Trimble Navigation Limited, Sunnyvale, Calif.

[ * ] Notice: This patent is subject to a terminal disclaimer.

[21] Appl. No.: 08/969,350

[22] Filed: Nov. 28, 1997

Related U.S. Application Data

[63] Continuation of application No. 08/580,504, Dec. 28, 1995, Pat. No. 5,812,961.

[51] Int. Cl.⁶ ............................. G06F 165/00; G01S 5/02
[52] U.S. Cl. .......................... 701/207; 701/213; 701/214; 701/215; 342/357; 342/457
[58] Field of Search ..................................... 701/207, 213, 701/214, 215, 219, 222, 223, 300, 302; 342/357, 352, 457; 455/12.1, 13.1

[56] References Cited

U.S. PATENT DOCUMENTS

| | | | |
|---|---|---|---|
| 4,445,118 | 4/1984 | Taylor et al. | 343/357 |
| 5,519,620 | 5/1996 | Talbot et al. | 364/449.8 |
| 5,563,607 | 10/1996 | Loomis et al. | 364/449.7 |
| 5,594,740 | 1/1997 | LaDue | 340/870.02 |
| 5,654,717 | 8/1997 | Nichols et al. | 342/357 |
| 5,758,261 | 5/1998 | Wiedeman | 455/13.1 |

*Primary Examiner*—Tan Q. Nguyen
*Attorney, Agent, or Firm*—David R. Gildea

[57] ABSTRACT

A method and an apparatus using a low Earth orbiting (LEO) satellite signal to augment the Global Positioning System (GPS) for finding a location vector between a GPS user receiver and a GPS reference receiver. The GPS user receiver computes a LEO user-reference carrier phase difference and a GPS user-reference carrier phase difference for the LEO satellite signal and a GPS satellite signal, respectively, received simultaneously at the GPS user receiver and the GPS reference receiver. Carrier phase double differences are computed from a difference between the GPS user-reference carrier phases from two GPS satellites and either the LEO user-reference carrier phases from two LEO satellites or the GPS user-reference carrier phase from one GPS satellite and the LEO user-reference carrier phase from one LEO satellite. The location vector is computed from a difference between the double differences for two satellite geometries. The GPS reference receiver communicates the reference carrier phase data to the GPS user receiver through the LEO satellite. An ionospheric delay model is determined by tracking the LEO satellite signal as the LEO satellite traverses the sky. An optional calibrator corrects for measurement delay in determining the carrier phases in the GPS user receiver and the GPS reference receiver.

10 Claims, 4 Drawing Sheets

Fig_4A

Fig_4B

METHOD AND RECEIVER USING A LOW EARTH ORBITING SATELLITE SIGNAL TO AUGMENT THE GLOBAL POSITIONING SYSTEM

This application is a continuation of application Ser. No. 08/580,504, filed Dec. 28, 1995, status U.S. Pat. No. 5,812,961.

BACKGROUND OF THE INVENTION

1. Field of the Invention

The invention relates generally to Global Positioning System (GPS) receivers and more particularly to a method and an apparatus for computing a precise location using differential carrier phases of a GPS satellite signal and a low earth orbiting (LEO) satellite signal.

2. Description of the Prior Art

Global Positioning System (GPS) receiver systems commonly use differential carrier phase measurements for finding a precise location vector for a geographical location of a GPS user receiver with respect to a geographical location of a GPS reference receiver. The GPS reference receiver and the GPS user receiver each determine a phase of the carrier of a GPS satellite signal received from two or more GPS satellites in common view of both GPS receivers. The location vector is calculated by taking the difference between the carrier phase determined at the GPS user receiver and carrier phase determined at the GPS reference receiver for the GPS satellite signal for two or more satellite geometries.

The differential carrier phase measurement must solve three appreciable problems: 1) the carrier phases are ambiguous until the number of wavelengths of the GPS satellite signal between the GPS satellite and each of the GPS receivers is resolved, 2) the ionospheric delay of the GPS satellite signal from each GPS satellite to each GPS receiver must be known, and 3) the reference carrier phase measurements and reference pseudoranges must be communicated from the GPS reference receiver to the GPS user receiver.

The carrier phase of the GPS satellite signal from each GPS satellite to each GPS receiver is ambiguous unless the number of wavelengths of the GPS satellite signal between the GPS satellite and the GPS receiver is known or its effect is eliminated. This problem, known as cycle resolution, integer determination, or resolution of the integer, is well-known and solutions are described in several U.S. Patents, such as U.S. Pat. No. 4,170,776 by MacDoran, U.S. Pat. No. 4,667,203 by Counselman, U.S. Pat. No. 4,963,889 by Hatch, U.S. Pat. No. 5,296,861 by Knight, and U.S. Pat. No. 5,519,620 by Talbot et al. Existing GPS receiver systems resolve the number of wavelengths by observing the GPS satellite signal for the same GPS satellites at two or more different satellite geometries. Traditionally, the observation requires thirty or more minutes in order to allow the GPS satellites to achieve a required geometric variation. Several techniques exist or have been proposed for reducing the observation time by using more intelligent satellite selection, precise pseudorange information, and/or carrier phase measurements of the GPS satellite signal at both L1 and L2 carriers. However, all of these techniques are limited by the slow rate at which the GPS satellites sweep across the sky.

The GPS satellite signal received by each GPS receiver must have approximately the same delay in the ionosphere or the difference in the delays must be accurately modeled in order to compute an accurate location vector. One solution to this problem is to locate the GPS user receiver and the GPS reference receiver close together, typically within a few kilometers, so that the ionospheric delay can be assumed to be the same to each GPS receiver. However, this solution limits the length of the location vector that can be determined. Another solution is to use a world-wide ionospheric model that is provided in the GPS satellite signal. However, the world-wide ionospheric model that is provided typically only accounts for half of the effect of ionospheric delay. Another solution is to receive the GPS satellite signal at both an L1 frequency and an L2 frequency as the GPS satellites traverse across the sky. Then, because the ionospheric delay of a signal is proportional to the inverse square of frequency of the signal, an ionospheric model can be estimated that is more accurate locally than the world-wide model. Unfortunately, the GPS receivers capable of receiving both the L1 and L2 frequencies are relatively expensive. Further, because of the long time for the GPS satellite to traverse the sky, the estimate loses accuracy during times of day when the ionosphere is changing rapidly.

Existing GPS receiver systems operate in real-time by transmitting carrier phase and pseudorange measurements from the GPS reference receiver to the GPS user receiver. Typically, the transmission is accomplished with terrestrial radios operating in the VHF or UHF frequency range. Unfortunately, these radios are subject to interference, multipath, shadowing, line-of-sight limits, and restrictive licensing requirements. Although satellite communication has been used for broadcasting the pseudorange measurements, it has not been seriously considered for broadcasting carrier phase measurements because the carrier phase measurements age too much during the time of travel up to the satellite and back down to Earth and in the latency in the satellite itself for determining the location vector with a required accuracy.

There is a need for a GPS receiver system and a method for improving the speed of resolving the integer number of wavelengths, for a rapid determination of a local ionospheric delay model, and for robust communication of carrier phase measurements between a GPS reference receiver and a GPS user receiver over a wide geographical area.

SUMMARY OF THE INVENTION

It is therefore an object of the present invention to provide a Global Positioning System (GPS) user receiver, a GPS reference receiver, and a method for using a low Earth orbiting (LEO) satellite signal from a LEO satellite for augmenting the Global Positioning System for finding a location vector between the GPS user receiver and the GPS reference receiver.

Another object is to provide a GPS receiver and method for using a LEO satellite signal from a LEO satellite having a high angular velocity in the sky above the GPS receiver for improving the speed of resolving a number of wavelengths of a GPS satellite signal from a GPS satellite to the GPS receiver.

Another object is to provide a GPS receiver and method for using a LEO satellite signal from a LEO satellite having a high angular velocity in the sky above the GPS receiver for rapidly constructing an accurate local ionospheric delay model.

Another object is to provide a GPS receiver system and a method for using a LEO satellite signal for communicating a carrier phase measurement from a GPS reference receiver to a GPS user receiver.

Briefly, a preferred embodiment includes a GPS reference receiver and a GPS user receiver for determining a GPS carrier phase from a GPS satellite signal and a LEO carrier phase from a LEO satellite signal. The GPS user receiver receives an airwave signal including reference data for the GPS and the LEO carrier phases determined at the GPS reference receiver and computes a difference between these carrier phases and the carrier phases of the GPS and the LEO satellite signals determined by the GPS user receiver. The GPS user receiver computes the location vector from a double difference of the GPS user-reference carrier phases for two or more GPS satellites and either a double difference of the LEO user-reference carrier phases for two or more LEO satellites or a double difference of the GPS user-reference carrier phase for one GPS satellite and the LEO user-reference carrier phase for one LEO satellite. Parameters for a model for ionospheric delay can be determined from information in the LEO satellite signal. Optionally, the parameters are determined from a divergence of a carrier phase measurement and a code time of arrival measurement for the LEO satellite signal as the LEO satellite traverses across the sky above the GPS user receiver. The GPS reference receiver and the GPS user receiver may include a calibrator for compensating for measurement delays in the GPS user receiver and the GPS reference receiver, respectively. A transmit radio transmits information for the carrier phases, the measurement delay, the ionospheric parameters, and pseudoranges determined at the GPS reference receiver to a radio receiver at the GPS user receiver over a terrestrial link or a satellite link using the LEO satellite.

An advantage of the present invention is that a GPS receiver and a method use a LEO satellite signal from a LEO satellite having a high angular velocity in the sky above the GPS receiver for augmenting the Global Positioning System for finding a location vector between the GPS user receiver and the GPS reference receiver.

Another advantage is that a GPS receiver and a method use a LEO satellite signal to increase the speed for computing a location vector by increasing the speed for resolving an integer number of wavelengths between a GPS satellite and the GPS receiver.

Another advantage is that a GPS receiver and a method use a LEO satellite signal for modeling an ionospheric delay, thereby increasing the geographical area of usefulness of a differential carrier phase measurement.

Another advantage is that a GPS receiver system and a method use a LEO satellite signal to communicate a reference carrier phase measurement from a GPS reference receiver to a GPS user receiver, thereby eliminating the up and down travel time and signal latency of a geosynchronous satellite link and the interference, multipath, shadowing, line-of-sight limits, and restrictive licensing requirements of a terrestrial link.

Although the present invention is described in terms of using a LEO satellite signal to augment a determination of location with the global positioning system, it could equally well be described in terms of using a GPS satellite signal to augment a determination of location with a low Earth orbiting satellite location system.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
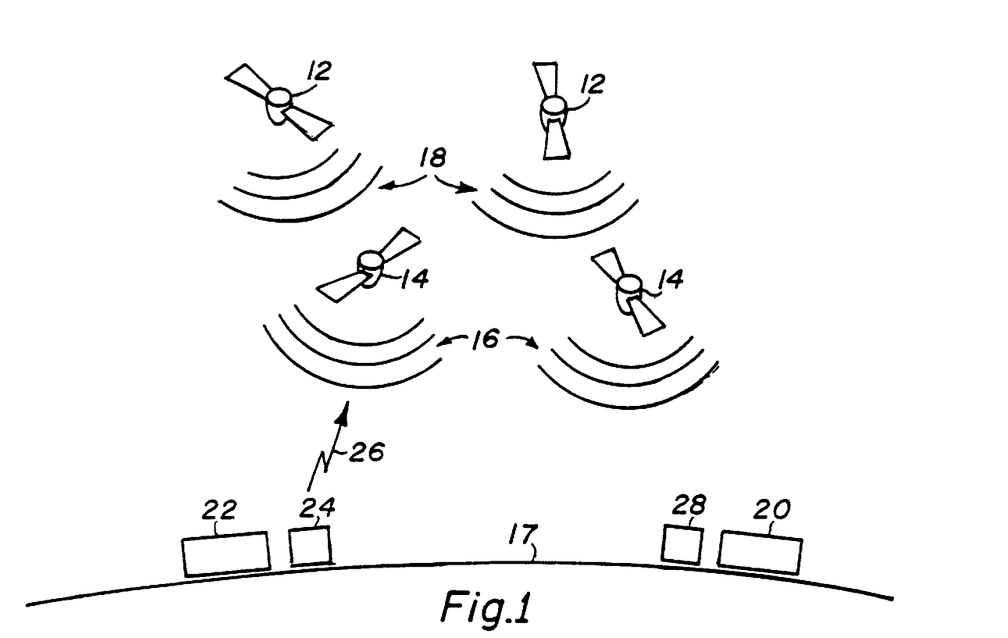
FIG. 1 is a block diagram of the present invention of a GPS receiving system for determining a location vector of a GPS user receiver with respect to a GPS reference receiver.

FIG. 1 illustrates a Global Positioning System (GPS) receiver system of the present invention referred to by the general reference number 10. The system 10 includes at least one Global Positioning System (GPS) satellite 12 and at least one low Earth orbiting (LEO) satellite 14. The GPS satellite 12 is one of a constellation of approximately twenty-four GPS satellites operated by United States Department of Defense orbiting the Earth approximately twice every twenty-four hours at an altitude of approximately ten thousand miles and traversing the sky above a location on the surface of the Earth in approximately four hours. Another satellite-based system called Global Orbiting NAvigational SyStem (GLONASS) is being developed and deployed by Russia. The basic goals, functions, and capabilities of the GLONASS are similar to the GPS. Although the present discussion focuses on a GPS-based system, a GLONASS-based system can be used for a similar function with a similar result.

The LEO satellite 14 is one of a constellation of satellites orbiting the Earth at an altitude of a few hundred miles, traversing the sky in ten minutes to an hour, and broadcasting a LEO satellite signal 14 having a carrier and modulated information. Because it traverses the sky at such a rapid rate, the LEO satellite has a high angular velocity over a point on the surface of the Earth 17 causing a rapid change in geometry of the satellite constellation. Such rapid change speeds the rate with which an accurate and unambiguous carrier phase can be determined. Several satellite constellation systems are available meeting such requirements including the Irridium system being developed by Motorola and the Globalstar system being developed by Loral and Qualcomm.

Each GPS satellite 12 broadcasts a GPS satellite signal 18 having two signals, $s_{L1}$ and $s_{L2}$, broadcast at carrier frequencies $f_{L1} \sim 1575.42$ MHz and $f_{L2} \sim 1227.60$ MHz, respectively. In the present invention, a GPS user receiver 20 and a GPS reference receiver 22 may be constructed to receive either the $s_{L1}$ signal or the $s_{L2}$ signal or both. The $s_{L1}$ signal includes a coarse/acquisition (C/A) code X(t) and a precise (P) code P(t) and the $s_{L2}$ signal includes the precise (P) code P(t) modulated on the carrier in direct sequence spread spectrum according to equations 1 and 2.

$$s_{L1(t)}=(2C_{XL1})^{(1/2)}D(t)X(t) \sin (2\pi f_{L1}(t)+\emptyset_{L1})+(2C_{PL1})^{(1/2)}D(t)P(t) \cos (2\pi f_{L1}(t)+\emptyset_{L1}) \quad (1)$$

$$s_{L2(t)}=(2C_{PL2})^{(1/2)}D(t)P(t) \sin (2\pi f_{L2}(t)+\emptyset_{L2}) \quad (2)$$

The equation 1 shows that the $s_{L1}$ signal is equal to a product of the square root of twice a C/A-code power $C_{XL1}$, a navigation data factor D(t) having an amplitude of one or minus one, the C/A code spreading factor X(t) having an amplitude of one or minus one, and the sine of a sum of a product of two pi, the frequency $f_{L1}$, and a time t, plus a carrier phase $\emptyset_{L1}$; plus a product of the square root twice a P-code power $C_{PL1}$, the navigation data D(t), the P-code spreading factor P(t) having an amplitude of one or minus one, and the cosine of the product of two pi, the frequency $f_{L1}$, and the time t, plus the carrier phase $\emptyset_{L1}$. The equation 2 shows that the $S_{L2}$ signal is equal to a product of the square root of twice the P-code power $C_{PL2}$, the navigation data D(t), the P-code spreading factor P(t) having an amplitude of one or minus one, and the sine of a sum of a product of two pi, the frequency $f_{L2}$, and the time t, plus a carrier phase $\emptyset_{L2}$.

The $s_{L1}$ signal has an inphase component and a quadrature phase component, where both are modulated by the navigation data D(t). The $s_{L2}$ signal has only one component modulated by the navigation data D(t). The navigation data D(t) is developed by the ground stations and accurately describes a location in space and a clock offset of the GPS satellite 12. The spread spectrum C/A-code X(t), modulates one of the $s_{L1}$ signal components at a chipping rate of about one megahertz. The characteristics of the C/A-code X(t) and the navigation data D(t) are published in GPS Interface Control Document ICD-GPS-200, Revision A, by Rockwell International Division, September 1984. The other $s_{L1}$ signal component and the $s_{L2}$ signal are modulated by the spread spectrum P-code P(t) at a chipping rate of about ten megahertz. The C/A-code X(t) is the basis of the Standard Positioning Service (SPS) which is for civilian use. The P-code P(t) is the basis of the Precise Positioning Service (PPS) which is solely for users authorized by the United States Department of Defense.

The GPS user receiver 20 and the GPS reference receiver 22 receive the GPS satellite signal 18, estimate a pseudorange based upon a time of arrival of the C/A-code X(t) and/or P-code P(t), and demodulate the navigation data D(t). Typically, the GPS user receiver 20 and the GPS reference receiver 22 are located on or near the surface of the Earth 17. Having four pseudoranges, the GPS user receiver 20 and the GPS reference receiver 22 can determine three spatial coordinates of a geographical location and a fourth coordinate of time. Fewer than four pseudoranges are required if the GPS user receiver 20 is given other information such as an altitude or a precise time. When the GPS user receiver 20 and the GPS reference receiver 22 receive the GPS satellite signal 18 from at least two common GPS satellites 12, the GPS user receiver 20 can improve the precision of the three spatial coordinates of its relative geographical location with respect to the GPS reference receiver 22 by measuring a phase of the carrier of the GPS satellite signal 18 as it is received at the GPS user receiver 20 and comparing that phase with a phase for the same carrier as it is received and measured by the GPS reference receiver 22. Equations 3 and 4 describe the code time of arrival and the carrier phase observations at the GPS reference receiver 22 for the $s_{L1}$ signal and equations 5 and 6 describe the code time of arrival and the carrier phase observations at the GPS reference receiver 22 for the $s_{L2}$ signal.

$$\tau^g_{mL1} = (|r^g_m| + b_{mL1}^{GPS} - B^g) + \nu^g_{G\,mL1} \quad (3)$$

$$\Phi^g_{mL1} = (|r^g_m| + b_{mL2}^{GPS} - B^g) + N^g_m \lambda_{L1} + \nu^g_{P\,mL1} \quad (4)$$

$$\tau^g_{mL2} = (|r^g_m| + b_{mL1}^{GPS} - B^g) + \nu^g_{G\,mL2} \quad (5)$$

$$\Phi^g_{mL2} = (|r^g_m| + b_{mL2}^{GPS} - B^g) + N^g_m \lambda_{L2} + \nu^g_{P\,mL2} \quad (6)$$

The equations 3 and 5 describe a GPS/reference code time of arrival $\tau^g_{mL1}$ and $\tau^g_{mL2}$ for the $s_{L1}$ and $s_{L2}$ signals, respectively, for the GPS satellite signal 18 from the GPS satellite 12 denoted "g" to the GPS reference receiver 22 denoted "m". The GPS/reference code time of arrival $\tau^g_{mL1}$ or $\tau^g_{mL2}$ equals a pseudorange $(|r^g_m| + b_m^{GPS} - B^g)$ where $|r^g_m|$ is the length of a three dimensional location vector $r^g_m$ between the GPS reference receiver 22 and the GPS satellite 12, $b_m^{GPS}$ is a GPS measurement delay in the GPS reference receiver 22, and $B^g$ is a clock offset from a GPS time for the GPS satellite 12 in broadcasting the GPS satellite signal 18; plus a noise term $\nu^g_{G\,mL1}$ or $\nu^g_{G\,mL2}$ that includes ionospheric, tropospheric group delay, and certain measurement errors. The equations 4 and 6 describe the GPS/reference carrier phases $\Phi^g_{mL1}$ and $\Phi^g_{mL2}$ for the $s_{L1}$ and $s_{L2}$ signals, respectively, for the GPS satellite signal 18 from the GPS satellite 12 denoted "g" to the GPS reference receiver 22 denoted "m". The GPS/reference carrier phase $\Phi^g_{mL1}$ or $\Phi^g_{mL2}$ equals the pseudorange $(|r^g_m| + b_m^{GPS} - B^g)$; plus an integer wavelength distance $N^g_m \lambda_{L1}$ or $N^g_m \lambda_{L2}$ of an unknown number of wavelengths of the GPS satellite signal 18 between the GPS satellite 12 and the GPS reference receiver 22; plus a noise term $\nu^g_{P\,mL1}$ or $\nu^g_{P\,mL2}$ that includes ionospheric and tropospheric phase delay and certain measurement errors. Importantly, the integer wavelength distances $N^g_m \lambda_{L1}$ and $N^g_m \lambda_{L2}$ are a product of an unknown integer $N^g_m$ times the length of the wave $\lambda_{L1}$ and $\lambda_{L2}$ of the GPS satellite signal 18 at the frequency $f_{L1}$ and the frequency $f_{L2}$, respectively.

A similar set of equations 7 to 10 describes the code time of arrival $\tau^g_{uL1}$ and $\tau^g_{uL2}$ and GPS/user carrier phase observations $\Phi^g_{uL1}$ and $\Phi^g_{uL2}$ for the $s_{L1}$ and $s_{L2}$ signals, respectively, for the GPS satellite signal 18 from the GPS satellite 12 denoted "g" to the GPS user receiver 20 denoted "u".

$$\tau^g_{uL1} = (|r^g_u| + b_{uL1}^{GPS} - B^g) + \nu^g_{G\,uL1} \quad (7)$$

$$\Phi^g_{uL1} = (|r^g_u| + b_{uL1}^{GPS} - B^g) + N^g_u \lambda_{L1} + \nu^g_{P\,uL1} \quad (8)$$

$$\tau^g_{uL2} = (|r^g_u| + b_{uL2}^{GPS} - B^g) + \nu^g_{G\,uL1} \quad (9)$$

$$\Phi^g_{uL2} = (|r^g_u| + b_{uL2}^{GPS} - B^g) + N^g_u \lambda_{L2} + \nu^g_{P\,uL1} \quad (10)$$

The equations 7 and 9 show a GPS/user code time of arrival $\tau^g_{uL1}$ and $\tau^g_{uL2}$ at the GPS user receiver 20 equals a pseudorange $(|r^g_u| + b_u^{GPS} - B^g)$ where $|r^g_u|$ is the length of a location vector $r^g_u$ between the GPS user receiver 20 and the GPS satellite 12, $b_u^{GPS}$ is a GPS measurement delay in the GPS user receiver 20, and $B^g$ is a clock offset from the GPS time for the GPS satellite 12 in broadcasting the GPS satellite signal 18; plus a noise term $\nu^g_{G\,uL1}$ or $\nu^g_{G\,uL2}$ that includes ionospheric and tropospheric group delay and plus certain measurement errors. The GPS/user carrier phase $\Phi^g_{uL1}$ or $\Phi^g_{uL2}$ equals the pseudorange $(|r^g_u| + b_u^{GPS} - B^g)$; plus an integer wavelength distance $N^g_u \lambda_{L1}$ or $N^g_u \lambda_{L2}$ of the GPS satellite signal 18 between the GPS satellite 12 and the GPS user receiver 20; plus a noise term $\nu^g_{P\,uL1}$ or $\nu^g_{P\,uL2}$ that includes ionospheric and tropospheric phase delay and certain measurement errors. The integer wavelength distances $N^g_u \lambda_{L1}$ and $N^g_u \lambda_{L2}$ are a product of an unknown integer $N^g_u$ times the length of the wave $\lambda_{L1}$ and $\lambda_{L2}$ of the GPS satellite signal at the frequency $f_{L1}$ and the frequency $f_{L2}$, respectively.

The GPS reference receiver 22 and the GPS user receiver 20 also receive the LEO satellite signal 16 with carrier phases as described in equations 11 and 12, respectively.

$$\Phi^k_m = (|r^k_m| + b_m^{LEO} - B^k) + N^k_m \lambda^{LEO} + \nu^k_{P\,m} \quad (11)$$

$$\Phi^k_u = (|r^k_u| + b_u^{LEO} - B^k) + N^k_u \lambda^{LEO} + \nu^k_{P\,u} \quad (12)$$

The equation 11 describes a LEO/reference carrier phase $\Phi^k_m$ for the LEO satellite signal 16 from the LEO satellite 14 denoted "k" as determined in the GPS reference receiver 22 denoted "m". The LEO/reference carrier phase $\Phi^k_m$ equals the pseudorange $(|r^k_m|+b_m^{LEO}-B^k)$ where $|r^k_m|$ is the length of a three dimensional location vector $r^k_m$ between the GPS reference receiver 22 and the LEO satellite 14, $b_m^{LEO}$ is a LEO measurement delay in the GPS reference receiver 22, and $B^k$ is a clock offset from the GPS time for the LEO satellite 14 in broadcasting the LEO satellite signal 16; plus an integer wavelength distance $N^k_m \lambda^{LEO}$ between the GPS reference receiver 22 and the LEO satellite 14; plus a noise term $v_{P^k_m}$ that includes ionospheric and tropospheric phase delay and certain measurement errors. Similarly, the equation 12 describes a LEO/user carrier phase $\Phi^k_u$ for the LEO satellite signal 16 from the LEO satellite 14 denoted "k" to the GPS user receiver 20 denoted "u". The LEO/user carrier phase $\Phi^k_u$ equals the pseudorange $(|r^k_u|+b_u^{LEO}-B^k)$ where $|r^k_u|$ is the length of a three dimensional location vector $r^k_u$ between the GPS user receiver 20 and the LEO satellite 14, $b_u^{LEO}$ is a LEO measurement delay in the GPS user receiver 22, and $B^k$ is a clock offset from the GPS time for the LEO satellite 14 in broadcasting the LEO satellite signal 16; plus an integer wavelength distance $N^k_u \lambda^{LEO}$ between the GPS user receiver 20 and the LEO satellite 14; plus a noise term $v_{P^k_u}$ that includes ionospheric and tropospheric phase delay and certain measurement errors.

A radio transmitter 24 located with the GPS reference receiver 22 transmits reference data including the GPS/reference carrier phase $\Phi^g_m$, the LEO/reference carrier phase $\Phi^k_m$, and the GPS/reference code time of arrival $\tau^g_m$ in an airwave reference data signal 26 to a radio receiver 28 located with the GPS user receiver 20. In order to expand the range of the application, the airwave reference data signal 26 may be received and re-transmitted by a terrestrial transponder or the LEO satellite 14 may be used to re-transmit the reference data in the LEO satellite signal 16. The radio receiver 28 demodulates the airwave reference data signal 26 or the LEO satellite signal 14 and passes the reference data to the GPS user receiver 20.

Figure 2A:
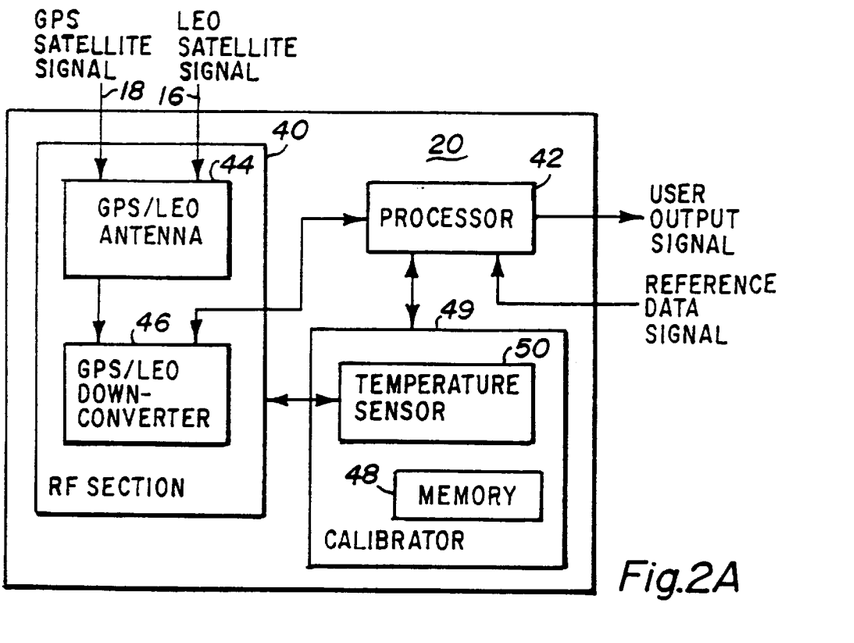
FIGS. 2a and 2b are block diagrams of the GPS user receiver of FIG. 1.

FIG. 2a illustrates a block diagram of a first embodiment of the GPS user receiver 20 including a radio frequency (RF) section 40 and a processor 42. A similar block diagram can be used for the GPS reference receiver 22. The RF section 40 includes a GPS/LEO antenna 44 for receiving the LEO satellite signal 16 and the GPS satellite signal 18 and issuing a responsive LEO conducted electrical signal and GPS conducted electrical signal, respectively. A GPS/LEO downconverter 46 frequency downconverts and samples the LEO conducted signal and the GPS conducted signal with a receiver clock; and issues a representative intermediate signal to the processor 42 including information for the LEO/user carrier phase $\Phi^k_u$ (Eq. 12) of the LEO satellite signal 16. Similarly, the GPS/LEO downconverter 46 frequency downconverts and samples the GPS conducted signal with the receiver clock, and issues a representative intermediate signal to the processor 42 including information for the GPS/user carrier phase $\Phi^g_u$ (Eqs. 8 and 10) and the GPS/user code time of arrival $\tau^g_u$ (Eqs. 7, 9).

The LEO measurement delay $b_u^{LEO}$ (Eq 12) corresponds to a difference in time between receiving the LEO satellite signal 16 and determining the LEO/user carrier phase $\Phi^k_u$ and includes a combination of a clock offset between the receiver clock and the GPS time and a LEO signal delay in the RF section 40. Similarly the GPS measurement delay $b_u^{GPS}$ (Eqs. 7–10) corresponds to a difference in time between receiving the GPS satellite signal 18 determining the GPS/user carrier phase $\Phi^g_u$ and includes a combination of a clock offset between the receiver clock and the GPS time and a GPS signal delay in the RF section 40. A cross user delay $b_u^{GPS,LEO}$ of a difference between the GPS measurement delay $b_u^{GPS}$ and the LEO measurement delay $b_u^{LEO}$ can be pre-determined and stored in a memory 48 in a calibrator 49 when the hardware of the GPS user receiver 20 is designed and/or built. Temperature compensating hardware can be built into the RF section 40 to minimize a variation between the GPS signal delay and the LEO signal delay versus temperature; or the temperature variation can be pre-determined and stored as software in the memory 48 and used with a temperature sensor 50 during operation.

The processor 42 includes digital processing circuitry, a microprocessor, memory, and executable code and variable data stored in the memory operating in a conventional manner for decoding the navigation data D(t); receiving the reference data signal including information for the LEO/reference carrier phase $\Phi^k_m$ (Eq. 11), the GPS/reference carrier phase $\Phi^g_m$ (Eqs. 4 and 6), the GPS/reference code time of arrival $\tau^g_m$ (Eqs. 3 and 5) and the LEO and GPS measurement delays $b_m^{LEO}$ and $b_m^{GPS}$, or their difference, for the GPS reference receiver 22; calculating the GPS/user carrier phase $\Phi^g_u$ (Eqs. 8, 10) and the LEO/user carrier phase $\Phi^k_u$ (Eq. 12); computing a location vector $r_{u,m}$ for the geographical location of the GPS user receiver 20 relative to the geographical location of the GPS reference receiver 22; and providing data for the location vector $r_{u,m}$ in a user output signal. The calibrator 49 may share hardware and software with the processor 42.

Figure 2B:
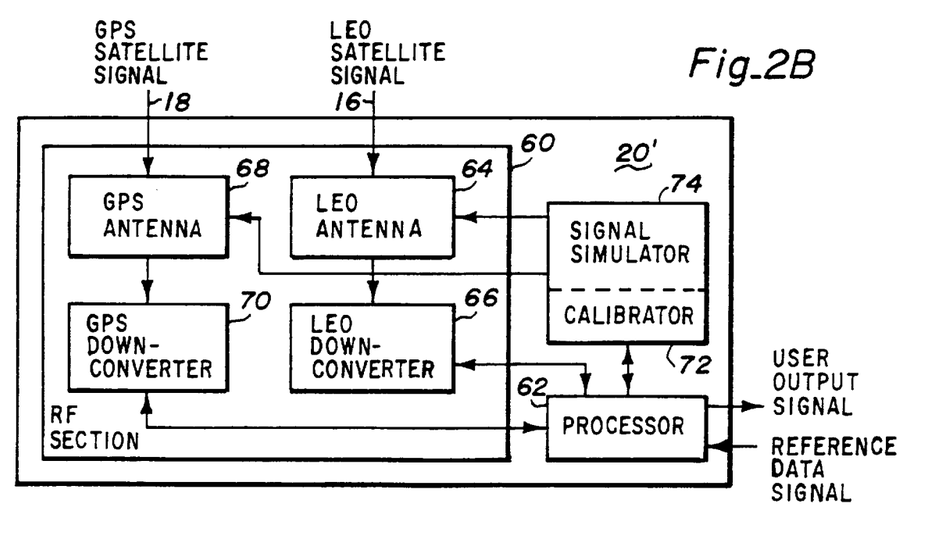

FIG. 2b illustrates a block diagram of a second embodiment of the GPS user receiver 20' of the present invention including a radio frequency (RF) section 60 and a processor 62. A similar block diagram can be used for the GPS reference receiver 22. The RF section 60 includes a LEO antenna 64 for receiving the LEO satellite signal 16 and issuing a conducted LEO electrical signal to a LEO downconverter 66, and a GPS antenna 68 for receiving the GPS satellite signal 18 and issuing a conducted GPS electrical signal to a GPS downconverter 70. The LEO downconverter 66 frequency downconverts and samples the LEO conducted signal with a receiver clock; and issues a representative intermediate signal including information for the LEO/user carrier phase $\Phi^k_u$ (Eq. 12) to the processor 62. The GPS downconverter 70 frequency downconverts and samples the GPS conducted signal with the receiver clock and issues a representative intermediate signal including information for the GPS/user carrier phase $\Phi^g_u$ (Eqs. 8, 10) and the GPS/user code time of arrival $\tau^g_u$ (Eqs. 7, 9) to the processor 62.

The LEO measurement delay $b_u^{LEO}$ (Eq 12) corresponds to a difference in time between receiving the LEO satellite signal 16 and determining the LEO/user carrier phase $\Phi^k_u$ and includes a combination of a clock offset between the receiver clock and the GPS time and a LEO signal delay in the LEO antenna 64 and the LEO downconverter 66. Similarly the GPS measurement delay $b_u^{GPS}$ (Eqs. 7–10) corresponds to a difference in time between receiving the GPS satellite signal 18 determining the GPS/user carrier phase $\Phi^g_u$ and includes a combination of a clock offset between the receiver clock and the GPS time and a GPS signal delay in the GPS antenna 68 and the GPS downconverter 70. An optional calibrator 72 includes a signal simulator 74 for coupling a LEO simulation signal into the LEO antenna 64 and coupling a GPS simulation signal into the GPS antenna 68. The LEO simulation signal is downconverted and sampled by the LEO downconverter 66 and passed to the processor 62. Similarly, the GPS simulation signal is downconverted and sampled by the GPS downconverter 70 and passed to the processor 62. The calibrator 72 computes the LEO and GPS measurement delays $b_u^{LEO}$ and $b_u^{GPS}$ by comparing the carrier phases of the LEO and GPS simulated signals before coupling into the LEO antenna 64 and GPS antenna 68 to the carrier phases after passing through the LEO downconverter 66 and GPS downconverter 70, respectively.

The processor 62 includes digital processing circuitry, a microprocessor, memory, and executable code and variable data stored in the memory operating in a conventional manner for decoding the navigation data D(t); receiving the reference data signal including information for the LEO/reference carrier phase $\Phi^k_m$ (Eq. 11), the GPS/reference carrier phase $\Phi^g_m$ (Eqs. 4 and 6), the GPS/reference code time of arrival $\tau^g_m$ (Eqs. 3 and 5), and the LEO and GPS measurement delays $b_u^{LEO}$ and $b_u^{GPS}$; calculating the GPS/user carrier phase $\Phi^g_u$ (Eqs. 8, 10) and the LEO/user carrier phase $\Phi^k_u$ (Eq. 12); computing a location vector $r_{u,m}$ for the geographical location of the GPS user receiver 20 relative to the geographical location of the GPS reference receiver 22; and providing data for the location vector $r_{u,m}$ in a user output signal. The calibrator 72 may share hardware and software with the processor 62.

Figure 3A:
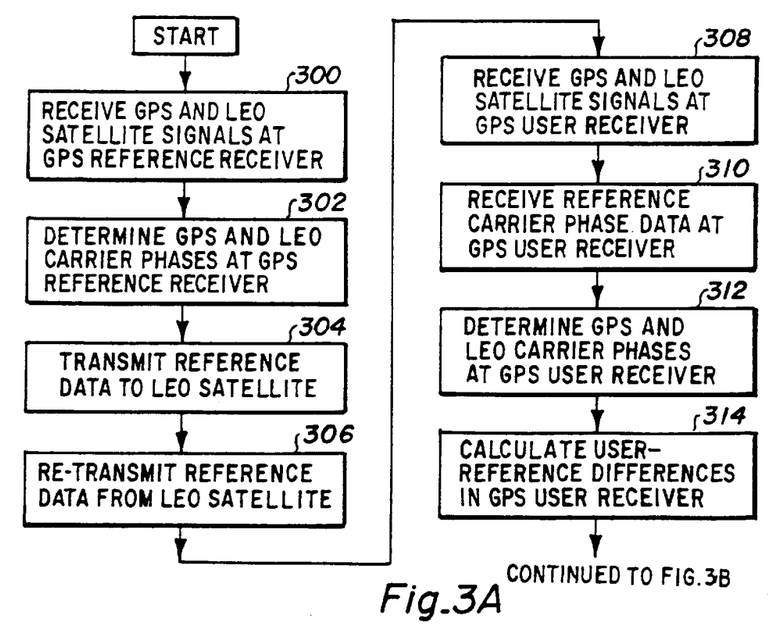
FIGS. 3a–b are flow charts of a method using differential carrier phases for determining the location vector of FIG. 1.
Figure 3B:
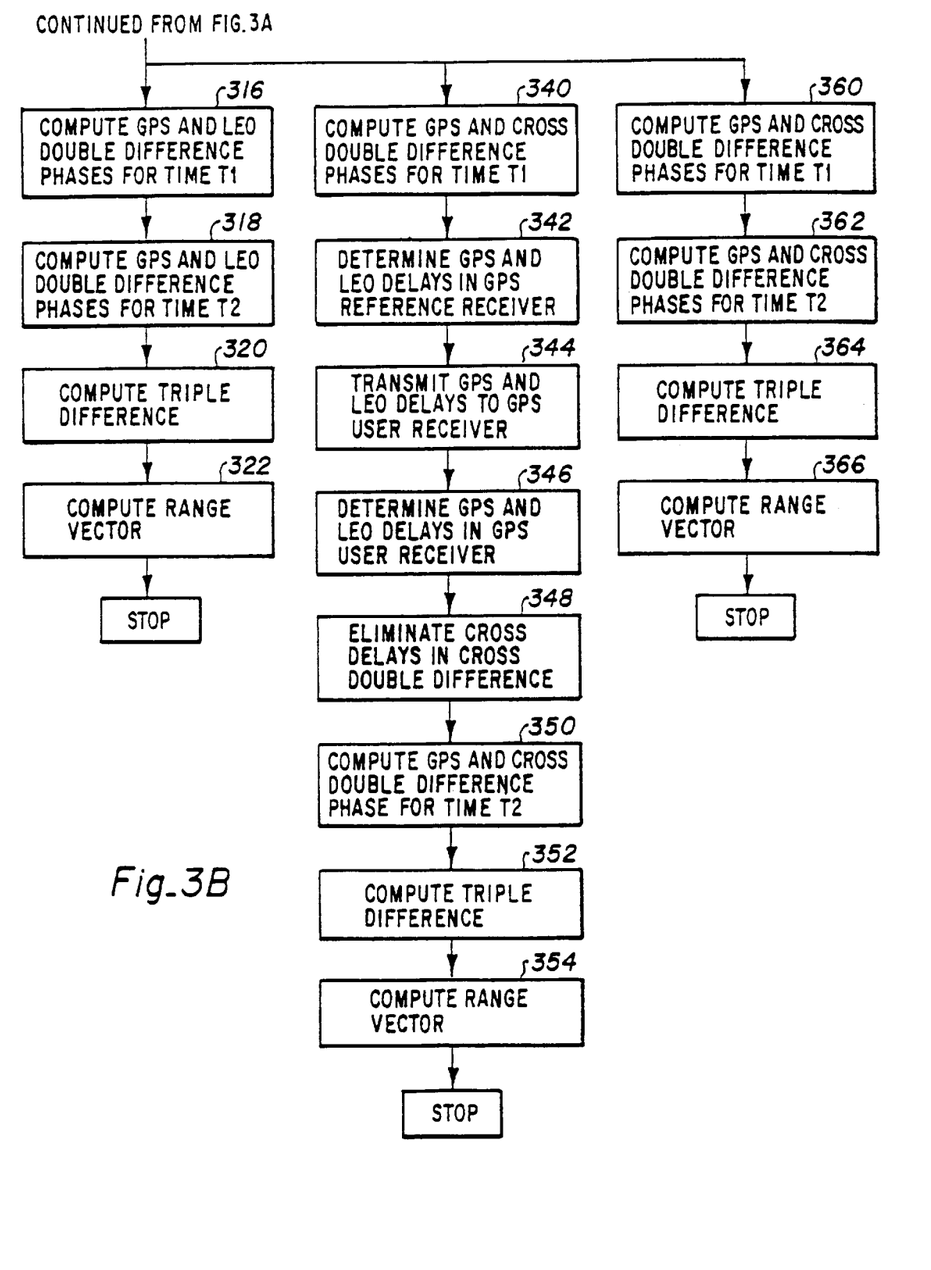

FIGS. 3a and 3b illustrate a flow chart of a method using differential carrier phases for computing the geographical location of the GPS user receiver 20 with respect to the GPS reference receiver 22. In a step 300 the GPS reference receiver 22 receives the LEO satellite signal 16 from at least one LEO satellite 14 and receives either the $s_{L1}$ signal (Eq. 1), the $s_{L2}$ signal (Eq. 2), or both in the GPS satellite signal 18 from at least two GPS satellites 12. In a step 302 the GPS reference receiver 22 determines the LEO/reference carrier phase $\Phi^k_m$ (Eq. 11) and the GPS/reference carrier phase $\Phi^g_m$ (Eqs. 4, 6). In a step 304 the reference radio transmitter 24 transmits an airwave reference data signal 26 including reference data including the LEO/reference carrier phase $\Phi^k_m$ (Eq. 11), the GPS/reference carrier phase $\Phi^g_m$ (Eqs. 4, 6), and the GPS/reference code time of arrival $\tau^g_m$ (Eqs. 3, 5). In a step 306 the airwave reference data signal 26 is received by the LEO satellite 14, by another low Earth orbiting satellite, or by terrestrial repeater and is re-transmitted. In a step 308 the GPS user receiver 20 receives the LEO satellite signal 16 from at least one of the same LEO satellites from which the LEO satellite signal 16 was received by the GPS reference receiver 22; and the GPS satellite signal 18 from at least two of the same GPS satellites 12 from which the GPS satellite signal 18 was received by the GPS reference receiver 22. In a step 310 the user radio receiver 28 receives the LEO satellite signal 16 and passes the reference data to the GPS user receiver 20. Alternatively, the user radio receiver 28 receives the airwave reference data signal 26 directly from the reference radio receiver 24. In a step 312 the GPS user receiver 20 determines the LEO/user carrier phase $\Phi^k_u$ (Eq. 11) and the GPS/user carrier phase $\Phi^g_u$ (Eqs. 8,10).

In a step 314 the GPS user receiver 20 calculates a GPS user-reference phase difference $\Delta\Phi^g_{u,m}$ between the GPS/user carrier phase $\Phi^g_u$ (Eqs. 8, 10) and the GPS/reference carrier phase $\Phi^g_m$ (Eqs. 4, 6) and a LEO user-reference phase difference $\Delta\Phi^k_{u,m}$ between the LEO/user carrier phase $\Phi^k_u$ (Eq. 12) and the LEO/reference carrier phase $\Phi^k_m$ (Eq. 11) as described in equations 13 and 14, respectively.

$$\Delta\Phi^g_{u,m} = r_{u,m} \cdot 1^g + \Delta b_{u,m}^{GPS} + \Delta N^g_{u,m}\lambda^{GPS} + \Delta v^g_{P_{u,m}} \quad (13)$$

$$\Delta\Phi^k_{u,m} = r_{u,m} \cdot 1^k + \Delta b_{u,m}^{LEO} + \Delta N^k_{u,m}\lambda^{LEO} + \Delta v^k_{P_{u,m}} \quad (14)$$

The equation 13 shows that the GPS user-reference phase difference $\Delta\Phi^g_{u,m}$ equals a dot product of the three dimensional location vector $r_{u,m}$ between the GPS user receiver 20 and the GPS reference receiver 22 and a three dimensional GPS unit vector $1^g_{u,m}$ for an approximate direction from the GPS satellite 12 to the GPS user receiver 20 or the GPS reference receiver 22; plus a GPS delay difference $\Delta b_{u,m}^{GPS}$ for a difference between the GPS measurement delay $b_u^{GPS}$ in the GPS user receiver 20 and the GPS measurement delay $b_m^{GPS}$ in the GPS reference receiver 22; plus a wavelength difference $\Delta N^g_{u,m}\lambda^{GPS}$ for a difference between the integer wavelength distance $N^g_u\lambda^{GPS}$ and the integer wavelength distance $N^g_m\lambda^{GPS}$; plus a noise difference term $\Delta v^g_{P_{u,m}}$ for a difference between the noise term $v^g_{P_u}$ for the GPS user receiver 20 and the noise term $v^g_{P_m}$ for the GPS reference receiver 22. Similarly, the equation 14 shows that the LEO user-reference phase difference $\Delta\Phi^k_{u,m}$ equals a dot product of the location vector $r_{u,m}$ and a three dimensional LEO unit vector $1^k$ for an approximate direction from the LEO satellite 14 to the GPS user receiver 20 or the GPS reference receiver 22; plus a LEO delay difference $\Delta b_{u,m}^{LEO}$ for a difference between the LEO measurement delay $b_u^{LEO}$ in the GPS user receiver 20 and the LEO measurement delay $b_m^{LEO}$ in the GPS reference receiver 22; plus a wavelength difference $\Delta N^k_{u,m}\lambda^{LEO}$ for a difference between the integer wavelength distance $N^k_u\lambda^{LEO}$ and the integer wavelength distance $N^k_m\lambda^{LEO}$; plus a noise difference term $\Delta v^k_{P_{u,m}}$ for a difference between the noise term $v^k_{P_u}$ and the noise term $v^k_{P_m}$. The approximate directions for the GPS unit vector $1^g$ and the LEO unit vector $1^k$ are valid because the distance from the GPS user receiver 20 to the GPS satellite 12 and the LEO satellite 14, respectively, is very large compared to the distance between the GPS user receiver 20 and the GPS reference receiver 22. However, in the case of the LEO unit vector $1^k$ the approximate direction may have to be replaced with an ongoing linearization when the GPS receivers 20 and 22 are widely spaced. The equations 13 and 14 show that the effect of the GPS clock offset $B^g$ of the GPS satellite 12 and the LEO clock offset $B^k$ of the LEO satellite 14 have been eliminated.

The three dimensional location vector $r_{u,m}$ is the difference between the geographical location of the GPS user receiver 20 and the geographical location of the GPS reference receiver 22 as described in equation 15.

$$r_{u,m} = \begin{bmatrix} x_{u,m} \\ y_{u,m} \\ z_{u,m} \end{bmatrix} \quad (15)$$

In the equation 15, $x_{u,m}$, $y_{u,m}$, and $z_{u,m}$ are scalar location components between the GPS user receiver 20 and the GPS reference receiver 22 in three orthogonal directions arbitrarily denoted x, y, and z, respectively. Three preferred methods are described below for solving for the location vector $r_{u,m}$.

In a first preferred method, the GPS satellite signal 18 is received by the GPS user receiver 20 and the GPS reference receiver 22 from two or more GPS satellites 12, denoted "g1", "g2", ... "gG" and the LEO satellite signal 16 is received by the GPS user receiver 20 and the GPS reference receiver 22 from two or more LEO satellites 14, denoted "k1", "k2", ... "kK". A "double differencing" technique is then used to resolve the effect of the GPS and LEO delay differences $\Delta b_{u,m}^{GPS}$ and $\Delta b_{u,m}^{LEO}$ of the equations 13 and 14, respectively. Then, a "triple differencing technique is used to resolve the wavelength differences $\Delta N^g_{u,m}\lambda^{GPS}$ and $\Delta N^k_{u,m}\lambda^{LEO}$ of the equations 13 and 14, respectively.

In a step 316 a GPS double difference $\nabla\Delta\Phi^{g1,g2}$ is computed by taking a difference between the GPS user-reference phase difference, $\Delta\Phi^g_{u,m}$ (Eq. 13) for the g1 GPS satellite 12 and the GPS user-reference phase difference, $\Delta\Phi^g_{u,m}$ (Eq. 13) for the g2 GPS satellite 12. A LEO double difference $\nabla\Delta\Phi^{k1,k2}$ is determined by taking a difference between the LEO user-reference phase difference $\Delta\Phi^k_{u,m}$ (Eq. 14) for the k1 LEO satellite 14 and the LEO user-reference phase difference $\Delta\Phi^k_{u,m}$ (Eq. 14) for the k2 LEO satellite 14. The GPS double difference $\nabla\Delta\Phi^{g1,g2}$ and the LEO double difference $\nabla\Delta\Phi^{k1,k2}$ are described in equations 16 and 17, respectively.

$$\nabla\Delta\Phi^{g1,g2} = r_{u,m} \cdot \Delta l^{g1,g2} + \nabla\Delta N^{g1,g2} + \nabla\Delta v_P^{g1,g2} \qquad (16)$$

$$\nabla\Delta\Phi^{k1,k2} = r_{u,m} \cdot \Delta l^{k1,k2} + \nabla\Delta N^{k1,k2} + \nabla\Delta v_P^{k1,k2} \qquad (17)$$

The equation 16 shows that the GPS double difference $\nabla\Delta\Phi^{g1,g2}$ equals a dot product of the vector location $r_{u,m}$ and a GPS unit vector difference $\Delta l^{g1,g2}$ for a difference in direction between the GPS unit vector $l^g_{u,m}$ for the g1 GPS satellite 12 and the GPS unit vector $l^g_{u,m}$ for the g2 GPS satellite 12; plus a wavelength double difference $\nabla\Delta N^{g1,g2}$ for a difference between the wavelength difference $\nabla\Delta v_P^{g1,g2}$ for the g1 and the g2 GPS satellite 12; plus a double difference noise term $\nabla\Delta v_P^{g1,g2}$ for a difference between the noise difference term $\Delta v_P^g{}_{u,m}$ for the g1 and the g2 GPS satellite 12. Similarly, the equation 17 shows that the LEO double difference $\nabla\Delta\Phi^{k1,k2}$ equals a dot product of the vector location $r_{u,m}$ and the LEO unit vector difference $\Delta l^{k1,k2}$ for a difference in direction between the LEO unit vector difference $l^k_{u,m}$ for the k1 and the k2 LEO satellite 14; plus a wavelength double difference $\nabla\Delta N^{k1,k2}$ for a difference between the wavelength difference $\Delta N^k_{u,m}\lambda^{LEO}$ for the k1 and k2 LEO satellite 14; plus a double difference noise term $\nabla\Delta v_P^{k1,k2}$ for the difference between the noise difference term $\Delta v_P^k{}_{u,m}$ for a difference for the k1 and the k2 LEO satellite 14.

When a total of G GPS satellites 12 and K LEO satellites 14 are in view of both the GPS user receiver 20 and the GPS reference receiver 22 then G−1+K−1 independent double differences equations are available for computing the vector location $r_{u,m}$. At an observation time $t_1$, a matrix equation 18 describes the GPS double differences $\nabla\Delta\Phi(t_1)^{g1,g2}$ to $\nabla\Delta\Phi(t_1)^{g1,gG}$ and LEO double differences $\nabla\Delta\Phi(t_1)^{k1,k2}$ to $\nabla\Delta\Phi(t_1)^{k1,kK}$.

$$\begin{bmatrix} \nabla\Delta\Phi(t_1)^{g1,g2} \\ \nabla\Delta\Phi(t_1)^{g1,g3} \\ \vdots \\ \nabla\Delta\Phi(t_1)^{g1,gG} \\ \nabla\Delta\Phi(t_1)^{k1,k2} \\ \nabla\Delta\Phi(t_1)^{k1,k3} \\ \vdots \\ \nabla\Delta\Phi(t_1)^{k1,kK} \end{bmatrix} = \qquad (18)$$

$$\begin{bmatrix} \Delta l(t_1)^{g1,g2} & \vdots \\ \Delta l(t_1)^{g1,g3} & \vdots \\ \cdots & \\ \Delta l(t_1)^{g1,gG} & \vdots \\ \Delta l(t_1)^{k1,k2} & \vdots \\ \Delta l(t_1)^{k1,k3} & \vdots \\ \cdots & \\ \Delta l(t_1)^{k1,kK} & \vdots \end{bmatrix} \begin{bmatrix} r(t_1)_{u,m} \\ \nabla\Delta N^{g1,g2} \\ \nabla\Delta N^{g1,g3} \\ \cdots \\ \nabla\Delta N^{g1,gG} \\ \nabla\Delta N^{k1,k2} \\ \nabla\Delta N^{k1,k3} \\ \cdots \\ \nabla\Delta N^{k1,kK} \end{bmatrix} + \begin{bmatrix} \nabla\Delta v_P(t_1)^{g1,g2} \\ \nabla\Delta v_P(t_1)^{g1,g3} \\ \cdots \\ \nabla\Delta v_P(t_1)^{g1,gG} \\ \nabla\Delta v_P(t_1)^{k1,k2} \\ \nabla\Delta v_P(t_1)^{k1,k3} \\ \cdots \\ \nabla\Delta v_P(t_1)^{k1,kK} \end{bmatrix}$$

In the equation 18, identity matrix I is a square matrix having ones in the top left to the bottom right diagonal and zeroes elsewhere.

In a step 318 the GPS user receiver 20 and the GPS reference receiver 22 receive the GPS and the LEO satellite signals 18 and 16 at a time $t_2$ and compute a carrier phase double difference column matrix for the GPS double differences $\nabla\Delta\Phi(t_2)^{g1,g2}$ to $\nabla\Delta\Phi(t_2)^{g1,gG}$ and the LEO double differences $\nabla\Delta\Phi(t_2)^{k1,k2}$ to $\nabla\Delta\Phi(t_2)^{k1,kK}$ In a step 320 the GPS user receiver 20 computes a triple difference column matrix $\delta_{1,2}$ for a difference between the GPS and LEO double differences at the time $t_1$ (Eq. 18) and the GPS and LEO double differences, respectively, at the time $t_2$. Using matrix algebra the wavelength double differences $\nabla\Delta N\lambda^{g1,g2}$ to $\nabla\Delta N\lambda^{k1,kK}$ and the identity matrix I are eliminated and the triple difference $\delta_{1,2}$ can be described in an equation 19.

$$\delta_{1,2} = H(t_1)r(t_1)_{u,m} + v(t_1) - (H(t_2)r(t_2)_{u,m} + v(t_2)) \qquad (19)$$

In the equation 19 the triple difference $\delta_{1,2}$ is described as a difference of a matrix product of a satellite geometry matrix $H(t_1)$ as described in an equation 19.1 for an arbitrary time $t_n$ and the location vector $r(t_n)_{u,m}$ (Eq. 15) at the time $t_n$; plus a noise column matrix $v(t_n)$ at the time $t_n$ as described in an equation 19.2. The equation 19.1 shows that the satellite geometry matrix $H(t_n)$ consists of the GPS unit vector differences $\Delta l(t_n)^{g1,g2}$ to $\Delta l(t_n)^{g1,gG}$ and the LEO unit vector differences $\Delta l(t_n)^{k1,k2}$ to $\Delta l(t_n)^{k1,kK}$.

$$H_n(t_n) = \begin{bmatrix} \Delta l(t_n)^{g1,g2} \\ \Delta l(t_n)^{g1,g3} \\ \cdots \\ \Delta l(t_n)^{g1,gG} \\ \Delta l(t_n)^{k1,k2} \\ \Delta l(t_n)^{k1,k3} \\ \cdots \\ \Delta l(t_n)^{k1,kK} \end{bmatrix} \qquad (19.1)$$

The equation 19.2 shows that the noise column matrix $v(t_n)$ consists of the double difference noise terms $\nabla\Delta v_P(t_n)^{g1,g2}$ to $\nabla\Delta v_P(t_n)^{g1,gG}$ and $\nabla\Delta v_P(t_n)^{k1,k2}$ to $\nabla\Delta v_P(t_n)^{k1,kK}$.

$$\underline{v}_n(t_n) = \begin{bmatrix} \nabla \Delta v p(t_n)^{g1,g2} \\ \nabla \Delta v p(t_n)^{g1,g3} \\ \ldots \\ \nabla \Delta v p(t_n)^{g1,gG} \\ \nabla \Delta v p(t_n)^{k1,k2} \\ \nabla \Delta v p(t_n)^{k1,k3} \\ \ldots \\ \nabla \Delta v p(t_n)^{k1,kK} \end{bmatrix} \quad (19.2)$$

In a step 322 a least squares, iterative approach can be used to solve for the location components $x(t_1)_{u,m}$, $y(t_1)_{u,m}$, and $z(t_1)_{u,m}$ at the time $t_1$ and location difference components $\Delta x(t_{1,2})_{u,m}$, $\Delta y(t_{1,2})_{u,m}$, and $\Delta z(t_{1,2})_{u,m}$ for a change in the location vector $r_{u,m}$ between the times $t_1$ and $t_2$.

In a second preferred method, the GPS satellite signal 18 is received by the GPS user receiver 20 and the GPS reference receiver 22 from the GPS satellites 12, denoted "g1", "g2", . . . "gG" and the LEO satellite signal 16 is received by the GPS user receiver 20 and the GPS reference receiver 22 from the LEO satellites 14, denoted "k1", "k2", . . . "kK". A delay calibration technique illustrated in the FIGS. 4a and 4b and described in the accompanying descriptions is then used to resolve the GPS and LEO delay differences $\Delta b_{u,m}$ (Eq. 13) and $\Delta b_{u,m}^{LEO}$ (Eq. 14), respectively. When a total of G GPS satellites 12 and K LEO satellites 14 are in view of both the GPS user receiver 20 and the GPS reference receiver 22 then G−1+K independent double difference equations are available for computing the location vector $r_{u,m}$. The second embodiment has an advantage over the first embodiment in requiring fewer satellites. Another advantage is that only one LEO satellite 14 is required to be in common view of the GPS receivers 20 and 22.

In a step 340 the GPS double difference $\nabla \Delta \Phi^{g1,g2}$ is computed at the time $t_1$ by taking a difference between the GPS user-reference phase difference $\Delta \Phi^g_{u,m}$ (Eq. 13) for the g1 GPS satellite 12 and the GPS user-reference phase difference $\Delta \Phi^g_{u,m}$ (Eq. 13) for the g2 GPS satellite 12. A cross double difference $\nabla \Delta \Phi^{g1,k1}$ is computed by taking a difference between the GPS user-reference phase difference $\Delta \Phi^g_{u,m}$ (Eq. 13) for the g1 GPS satellite 12 and the LEO user-reference phase difference $\Delta \Phi^k_{u,m}$ (Eq. 14) for the k1 LEO satellite 14. The GPS double difference $\nabla \Delta \Phi^{g1,g2}$ and the cross double difference $\nabla \Delta \Phi^{g1,k1}$ is described in equations 16, above and repeated here, and 20, respectively.

$$\nabla \Delta \Phi^{g1,g2} = r_{u,m} \cdot \Delta l^{g1,g2} + \nabla \Delta N^{g1,g2} + \nabla \Delta v_P^{g1,g2} \quad (16)$$

$$\nabla \Delta \Phi^{g1,k1} = r_{u,m} \cdot \Delta l^{g1,k1} + b_u^{GPS,LEO} - b_m^{GPS,LEO} + \nabla \Delta N^{g1,k1} + \nabla \Delta v_P^{g1,k1} \quad (20)$$

The equation 20 shows that the cross double difference $\nabla \Delta \Phi^{g1,k1}$ equals a dot product of the vector location $r_{u,m}$ and a cross unit vector difference $\Delta l^{g1,k1}$ for a difference in direction between the GPS unit vector difference $l^g_{u,m}$ for the g1 GPS satellite 12 and the LEO unit vector difference $l^k_{u,m}$ for the k1 LEO satellite 14; plus a cross wavelength double difference $\nabla \Delta N^{g1,k1}$ for a difference between the wavelength difference $\Delta N^g_{u,m} \lambda^{GPS}$ for the g1 GPS satellite 12 and the wavelength difference $\Delta N^g_{u,m} \lambda^{GPS}$ for the k1 LEO satellite 14; plus the cross user delay $b_u^{GPS,LEO}$ for a difference between the GPS measurement delay $b_u^{GPS}$ and the LEO measurement delay $b_u^{LEO}$; minus the cross reference delay $b_m^{GPS,LEO}$ for a difference between the GPS measurement delay $b_m^{GPS}$ and the LEO measurement delay $b_m^{LEO}$; plus a double difference noise term $\nabla \Delta v_P^{g1,k1}$ for the difference between the noise difference term $\Delta v_{P_{u,m}}^g$ for the g1 GPS satellite 12 and the noise difference term $\Delta v_{P_{u,m}}^k$ for a difference for the k1 LEO satellite 14. A matrix equation similar to the equation 18 can be used to describe the GPS double differences $\nabla \Delta \Phi^{g1,g2}$ to $\nabla \Delta \Phi^{g1,gG}$ and the cross double differences $\nabla \Delta \Phi^{g1,k1}$ to $\nabla \Delta \Phi^{g1,kK}$.

Figure 4A:
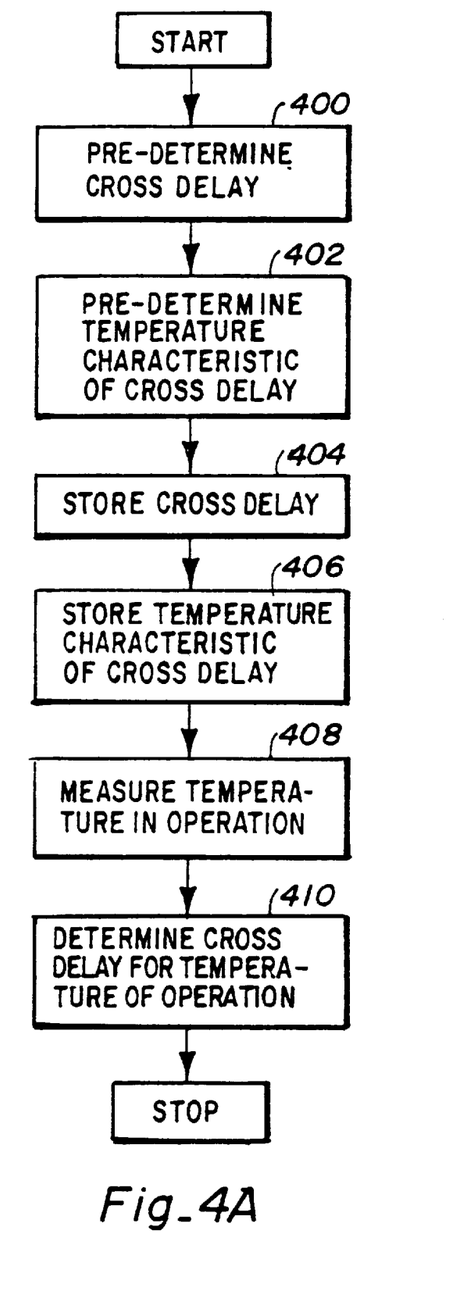
FIGS. 4a and 4b are flow charts of a method for determining measurement delays for calculating the carrier phase of FIGS. 2a and 2b, respectively.
Figure 4B:
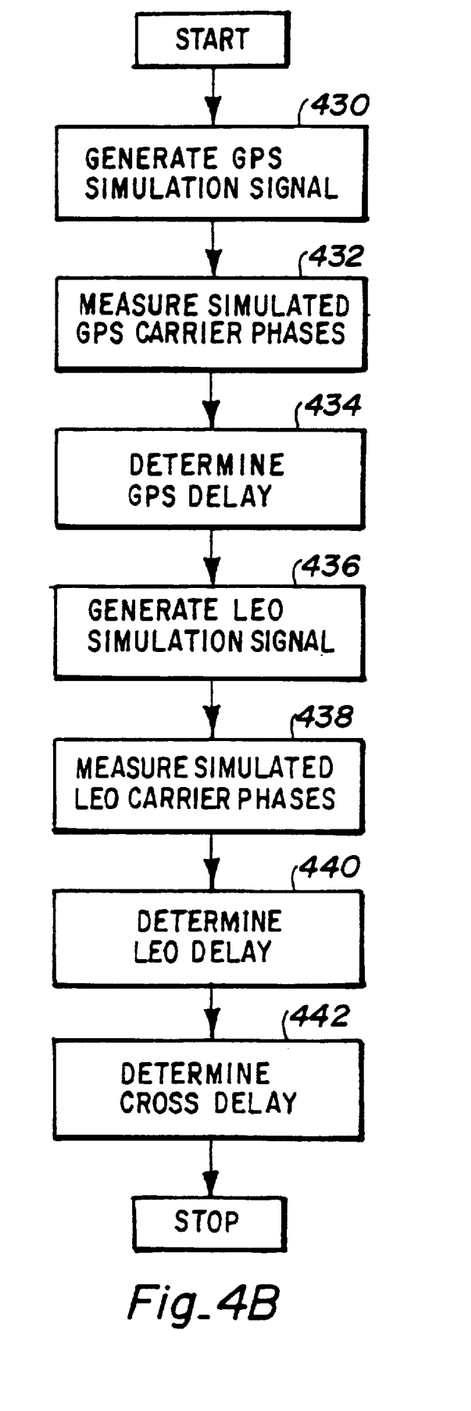

In a step 342 the cross reference delay $b_m^{GPS,LEO}$ is determined in the GPS reference receiver 22 according to the method illustrated in FIGS. 4a and 4b and hereafter described. In a step 344 the reference data including the cross reference delay $b_m^{GPS,LEO}$ is transmitted by the reference radio transmitter 24 in the airwave reference signal 26 either through the LEO satellite 14 or through another low Earth orbiting satellite or terrestrial repeater, received by the user radio receiver 28, and passed to the GPS user receiver 20. In a step 346, the GPS user receiver 20 determines the cross user delay $b_u^{GPS,LEO}$ according to the method illustrated in the FIGS. 4a and 4b and described in the accompanying descriptions. In a step 348 the cross user delay $b_u^{GPS,LEO}$ and the cross reference delay $b_m^{GPS,LEO}$ are eliminated from the equation 20. In a step 350, the GPS double differences $\nabla \Delta \Phi^{g1,g2}$ to $\nabla \Delta \Phi^{g1,gG}$ and the cross double differences $\nabla \Delta \Phi^{g1,k1}$ to $\nabla \Delta \Phi^{g1,kK}$ are computed at the time $t_2$. In a step 352 the GPS user receiver 20 computes a triple difference column matrix for a difference between the GPS and the cross double differences at the time $t_1$ and the time $t_2$. In a step 354 a least squares, iterative approach can be used to solve for the location components $x(t_1)_{u,m}$, $y(t_1)_{u,m}$, and $z(t_1)_{u,m}$ at the time $t_1$ and location difference components $\Delta x(t_{1,2})_{u,m}$, $\Delta y(t_{1,2})_{u,m}$, and $\Delta z(t_{1,2})_{u,m}$ for a change in the location vector $r_{u,m}$ between the times $t_1$ and $t_2$.

In a third preferred method, the GPS satellite signal 18 is received by the GPS user receiver 20 and the GPS reference receiver 22 from two or more GPS satellites 12, denoted "g1", "g2", . . . "gG" and the LEO satellite signal 16 is received by the GPS user receiver 20 and the GPS reference receiver 22 from the LEO satellite 14, denoted "k1", "k2", . . . "kK". The cross delay difference $\Delta b_{u,m}^{GPS,LEO}$ is combined with the wavelength differences $\nabla \Delta N^{g1,k1}$ to $\nabla \Delta N^{g1,kK}$ and then resolved by triple differencing. When a total of G GPS satellites 12 and K LEO satellites 14 are in view of both the GPS user receiver 20 and the GPS reference receiver 22 then G−1+K independent double difference equations are available for computing the location vector $r_{u,m}$. An advantage of the third embodiment over the first embodiment is that fewer satellites are required. Another advantage of the third embodiment over first embodiment is that only one LEO satellite 14 is required to be in common view. An advantage of the third embodiment over the second embodiment is that no extra hardware or software is required to calibrate the GPS and LEO delay differences $b_{u,m}^{GPS}$ and $\Delta b_{u,m}^{LEO}$, respectively. A disadvantage of the third embodiment over both the first and second embodiments is that the GPS delay difference $\Delta b_{u,m}^{GPS}$ and the LEO delay difference $\Delta b_{u,m}^{LEO}$ must be constant between the time $t_1$ and the time $t_2$. Another disadvantage of the third embodiment over the first and second embodiments is that the combination of the cross delay difference $\Delta b_{u,m}^{GPS,LEO}$ and the cross wavelength double differences $\nabla \Delta N^{g1,k1}$ to $\nabla \Delta N^{g1,kK}$ requires the use of floating point arithmetic.

In a step 360 the GPS double difference $\nabla \Delta \Phi^{g1,g2}$ (Eq. 16) is computed by taking a difference between the GPS user-reference phase difference $\Delta \Phi^g_{u,m}$ (Eq. 13) for the g1 GPS satellite 12 and the GPS user-reference phase difference $\Delta \Phi^g_{u,m}$ (Eq. 13) for the g2 GPS satellite 12. The cross double difference $\nabla \Delta \Phi^{g1,k1}$ (Eq. 20) is computed by taking a difference between the GPS user-reference phase difference $\Delta\Phi^g_{u,m}$ (Eq. 13) for the g1 GPS satellite 12 and the LEO user-reference phase difference $\Delta\Phi^k_{u,m}$ (Eq. 14) for the k1 LEO satellite 14. At an observation time $t_1$, a matrix equation 21 describes the GPS double differences $\nabla\Delta\Phi^{g1,g2}$ to $\nabla\Delta\Phi^{g1,gG}$ and the cross double difference $\nabla\Delta\Phi^{g1,k1}$ to $\nabla\Delta\Phi^{g1,kK}$.

$$\begin{bmatrix} \nabla\Delta\Phi(t_1)^{g1,g2} \\ \nabla\Delta\Phi(t_1)^{g1,g3} \\ \ldots \\ \nabla\Delta\Phi(t_1)^{g1,gG} \\ \nabla\Delta\Phi(t_1)^{g1,k1} \\ \nabla\Delta\Phi(t_1)^{g1,k2} \\ \ldots \\ \nabla\Delta\Phi(t_1)^{g1,kK} \end{bmatrix} = \tag{21}$$

$$\begin{bmatrix} \Delta l(t_1)^{g1,g2} & : \\ \Delta l(t_1)^{g1,g3} & : \\ \ldots & : \\ \Delta l(t_1)^{g1,gG} & : & I \\ \Delta l(t_1)^{g1,k1} & : \\ \Delta l(t_1)^{g1,k2} & : \\ \ldots & : \\ \Delta l(t_1)^{g1,kK} & : \end{bmatrix} \begin{bmatrix} r(t_1)_{u,m} \\ \nabla\Delta N^{g1,g2} \\ \nabla\Delta N^{g1,g3} \\ \ldots \\ \nabla\Delta N^{g1,gG} \\ \Delta b_{u,m}^{GPS,LEO} + \nabla\Delta N^{g1,k1} \\ \Delta b_{u,m}^{GPS,LEO} + \nabla\Delta N^{g1,k2} \\ \ldots \\ \Delta b_{u,m}^{GPS,LEO} + \nabla\Delta N^{k1,kK} \end{bmatrix} + \begin{bmatrix} \nabla\Delta\nu p(t_1)^{g1,g2} \\ \nabla\Delta\nu p(t_1)^{g1,g3} \\ \ldots \\ \nabla\Delta\nu p(t_1)^{g1,gG} \\ \nabla\Delta\nu p(t_1)^{g1,k1} \\ \nabla\Delta\nu p(t_1)^{g1,k2} \\ \ldots \\ \nabla\Delta\nu p(t_1)^{g1,kK} \end{bmatrix}$$

In a step 362 the GPS user receiver 20 and the GPS reference receiver 22 receive the GPS and the LEO satellite signals 18 and 16 at a time $t_2$ and compute the GPS double differences $\nabla\Delta\Phi(t_2)^{g1,g2}$ to $\nabla\Delta\Phi(t_2)^{g1,gG}$ and cross double differences $\nabla\Delta\Phi(t_2)^{g1,k1}$ to $\nabla\Delta\Phi(t_2)^{g1,kK}$.

In a step 364 the GPS user receiver 20 computes a triple difference column matrix $\delta_{1,2}$ for a difference between the carrier phase double differences at the time $t_1$ and the time $t_2$. Using matrix algebra the wavelength double differences $\nabla\Delta N^{g1,g2}$ to $\nabla\Delta N^{g1,gG}$ and the sums of the wavelengths $\Delta b_{u,m}^{GPS,LEO} + \nabla\Delta N^{k1,kK}$ and the identity matrix $I$ are eliminated and triple difference $\delta_{1,2}$ can be described in an equation 22.

$$\delta_{1,2} = H(t_1)r(t_1)_{u,m} + v(t_1) - H(t_2)r(t_2)_{u,m} - v(t_2) \tag{22}$$

In the equation 22 the triple difference $\delta_{1,2}$ is described as a difference of a matrix product of a satellite geometry matrix $H(t_1)$ as described in an equation 22.1 for an arbitrary time $t_n$ and the location vector $r(t_n)_{u,m}$ (Eq. 15) at the time $t_n$; plus a noise column matrix $v(t_n)$ at the time $t_n$ as described in an equation 22.2. The equation 22.1 shows that the satellite geometry matrix $H(t_n)$ consists of the GPS unit vector differences $\Delta l(t_n)^{g1,g2}$ to $\Delta l(t_n)^{g1,gG}$ and LEO unit vector differences $\Delta l(t_n)^{g1,k1}$ to $\Delta l(t_n)^{g1,kK}$ at the time $t_n$.

$$H_n(t_n) = \begin{bmatrix} \Delta l(t_n)^{g1,g2} \\ \Delta l(t_n)^{g1,g3} \\ \ldots \\ \Delta l(t_n)^{g1,gG} \\ \Delta l(t_n)^{g1,k1} \\ \Delta l(t_n)^{g1,k2} \\ \ldots \\ \Delta l(t_n)^{g1,kK} \end{bmatrix} \tag{22.1}$$

The equation 22.2 shows that the noise column matrix $v(t_n)$ consists of the double difference noise terms $\nabla\Delta v(t_n)^{g1,g2}$ to $\nabla\Delta v_P(t_n)^{g1,gG}$ and $\nabla\Delta v_P(t_n)^{g1,k1}$ to $\nabla\Delta v_P(t_n)^{g1,kK}$ at the time $t_n$.

$$v_n(t_n) = \begin{bmatrix} \nabla\Delta\nu p(t_n)^{g1,g2} \\ \nabla\Delta\nu p(t_n)^{g1,g3} \\ \ldots \\ \nabla\Delta\nu p(t_n)^{g1,gG} \\ \nabla\Delta\nu p(t_n)^{g1,k1} \\ \nabla\Delta\nu p(t_n)^{g1,k2} \\ \ldots \\ \nabla\Delta\nu p(t_n)^{g1,kK} \end{bmatrix} \tag{22.2}$$

In a step 366 a least squares, iterative approach can be used to solve for the location components $x(t_1)_{u,m}$, $y(t_1)_{u,m}$, and $z(t_1)_{u,m}$ at the time $t_1$ and location difference components $\Delta x(t_{1,2})_{u,m}$, $\Delta y(t1,2)_{u,m}$, and $\Delta z(t_{1,2})_{u,m}$ for a change in the location vector $r_{u,m}$ between the times $t_1$ and $t_2$.

In each of the three preferred embodiments above, the measurement accuracy of the location vector $r_{u,m}$ decreases as the size of the noise vector $v_n(t_n)$ (Eqs. 19.2, 22.2) increases. To reduce the size of the noise vector $v_n(t_n)$, an effect of the ionospheric delay variation for the various signal paths from the GPS and LEO satellites 12 and 14 to the GPS receivers 20 and 22 may be described as a separate term. By separating effects of ionospheric delay from the noise vector $v_n(t_n)$ terms, equations 3–17 and 20 may be re-written as 3a–17a and 20a, respectively, using the nomenclature developed above, as follows.

$$\tau^g_{mL1} = (|r^g_m| + b_{mL1}^{GPS} - B^g) + v^g_{mL1} + D^g_{mL1} \tag{3a}$$

$$\Phi^g_{mL1} = (|r^g_m| + b_{mL1}^{GPS} - B^g) + N^g_m \lambda_{L1} + v^g_{mL1} - D^g_{mL1} \tag{4a}$$

$$\tau^g_{mL2} = (|r^g_m| + b_{mL2}^{GPS} - B^g) + v^g_{mL2} + D^g_{mL2} \tag{5a}$$

$$\Phi^g_{mL2} = (|r^g_m| + b_{mL2}^{GPS} - B^g) + N^g_m \lambda_{L2} + v^g_{mL2} - D^g_{mL2} \tag{6a}$$

$$\tau^g_{uL1} = (|r^g_u| + b_{uL1}^{GPS} - B^g) + v^g_{uL1} + D^g_{uL1} \tag{7a}$$

$$\Phi^g_{uL1} = (|r^g_u| + b_{uL1}^{GPS} - B^g) + N^g_u \lambda_{L1} + v^g_{uL1} - D^g_{uL1} \tag{8a}$$

$$\tau^g_{uL2} = (|r^g_u| + b_{uL2}^{GPS} + B^g) + v^g_{uL2} + D^g_{uL2} \tag{9a}$$

$$\Phi^g_{uL2} = (|r^g_u| + b_{uL2}^{GPS} - B^g) + N^g_u \lambda_{L2} + v^g_{uL2} - D^g_{uL2} \tag{10a}$$

$$\Phi^k_m = (|r^k_m| + b_m^{LEO} - B^k) + N^k_m \lambda^{LEO} + v^k_m - D^k_m \tag{11a}$$

$$\Phi^k_u = (|r^k_u| + b_u^{LEO} - B^k) + N^k_u \lambda^{LEO} + v^k_u - D^k_u \tag{12a}$$

$$\Delta\Phi^g_{u,m} = r_{u,m} \cdot l^g + \Delta b_{u,m}^{GPS} + \Delta N^g_{u,m} \lambda^{GPS} + \Delta v^g_{u,m} - \Delta D^g_{u,m} \tag{13a}$$

$$\Delta\Phi^k_{u,m} = r_{u,m} \cdot l^k + \Delta b_{u,m}^{LEO} + \Delta N^k_{u,m} \lambda^{LEO} + \Delta v^k_{u,m} - \Delta D^k_{u,m} \tag{14a}$$

$$\nabla\Delta\Phi^{g1,g2} = r_{u,m} \cdot \Delta l^{g1,g2} + \nabla\Delta N^{g1,g2} + \nabla\Delta v^{g1,g2} - \nabla\Delta D^{g1,g2}_{u,m} \tag{16a}$$

$$\nabla\Delta\Phi^{k1,k2} = r_{u,m} \cdot \Delta l^{k1,k2} + \nabla\Delta N^{k1,k2} + \nabla\Delta v^{k1,k2} - \nabla\Delta D^{k1,k2}_{u,m} \quad (17a)$$

$$\nabla\Delta\Phi^{g1,k1} = r_{u,m} \cdot \Delta l^{g1,k1} + b_u^{GPS,LEO} - b_m^{GPS,LEO} + \nabla\Delta N^{g1,k1} + \nabla\Delta v^{g1,k1} - \nabla\Delta D^{g1,k1}_{u,m} \quad (20a)$$

The equations 3a and 4a include an ionospheric delay $D^g_{mL1}$ between the GPS satellite 12 and the GPS reference receiver 22 and a measurement noise $v^g_{mL1}$ at the frequency $f_{L1}$. The equations 5a and 6a include an ionospheric delay $D^g_{mL2}$ between the GPS satellite 12 and the GPS reference receiver 22 and a measurement noise $v^g_{mL2}$ at the frequency $f_{L2}$. The equations 7a and 8a include an ionospheric delay $D^g_{uL1}$ between the GPS satellite 12 and the GPS user receiver 20 and a measurement noise $v^g_{uL1}$ at the frequency $f_{L1}$. The equations 9a and 10a include an ionospheric delay $D^g_{uL2}$ between the GPS satellite 12 and the GPS user receiver 20 and a measurement noise $v^g_{uL2}$ at the frequency $f_{L2}$. The equations 11a includes an ionospheric delay $D^k_m$ from the LEO satellite 14 to the GPS reference receiver 22 and a measurement noise $v^k_m$. The equations 12a includes an ionospheric delay $D^k_u$ from the LEO satellite 14 to the GPS user receiver 20 and a measurement noise $v^k_u$. In the equation 13a an ionospheric delay difference $\Delta D^g_{u,m}$ is a difference between the ionospheric delay $D^g_u$ and $D^g_m$; and a measurement noise $\Delta v^g_{u,m}$ is a difference between the measurement noise $v^g_u$ and $v^g_m$. In the equation 14a an ionospheric delay difference $\Delta D^k_{u,m}$ is a difference between the ionospheric delay $D^g_u$ and $D^g_m$; and a measurement noise $\Delta v^k_{u,m}$ is a difference between the measurement noise $v^k_u$ and $v^k_m$. The equation 16a shows an ionospheric delay double difference $\nabla\Delta D^{g1,g2}_{u,m}$ for a difference between the ionospheric delay difference $\Delta D^g_{u,m}$ for the g1 GPS satellite 12 and the ionospheric delay difference $\Delta D^g_{u,m}$ for the g2 GPS satellite 12; and a measurement noise of $\nabla\Delta v^{g1,g2}$ for a difference between $\Delta v^g_{u,m}$ for the g1 and g2 GPS satellite 12. The equation 17a shows an ionospheric delay double difference $\nabla\Delta D^{k1,k2}_{u,m}$ for a difference between the ionospheric delay difference $\Delta D^k_{u,m}$ for the k1 LEO satellite 14 and the ionospheric delay difference $\Delta D^k_{u,m}$ for the k2 LEO satellite 14; and a measurement noise of $\nabla\Delta v^{k1,k2}$ for a difference between $\Delta v^k_{u,m}$ for the k1 and k2 LEO satellite 14. The equation 20a shows an ionospheric delay double difference $\nabla\Delta D^{g1,k1}_{u,m}$ for a difference between the ionospheric delay difference $\Delta D^g_{u,m}$ for the g1 GPS satellite 12 and the ionospheric delay difference $\Delta D^k_{u,m}$ for the k1 LEO satellite 14; and a measurement noise of $\nabla\Delta v^{g1,k1}$ for a difference between $\Delta v^g_{u,m}$ for the g1 GPS satellite 12 and the $\Delta v^k_{u,m}$ for the k1 LEO satellite 14.

When the LEO satellite signal 16 includes a modulated code, equations 23 and 24 describe the time of arrival observations at the GPS reference receiver 22 and the GPS user receiver 20, respectively.

$$\tau^k_m = (|r^k_m| + b_m^{LEO} - B^k) + v^k_m + D^k_m \quad (23)$$

$$\tau^k_u = (|r^k_u| + b_u^{LEO} - B^k) + v^k_u + D^k_u \quad (24)$$

The equation 23 shows that a LEO/reference code time of arrival $\tau^k_m$ for the LEO satellite signal 16 from the LEO satellite 14 denoted "k" to the GPS reference receiver 22 denoted "m" equals the pseudorange $(|r^k_m| + b_m^{LEO} - B^k)$ (Eq. 11); plus the ionospheric delay $D^k_m$ (Eq. 11a); plus the measurement noise $v^k_m$ (Eq. 11a). Similarly, the equation 24 shows that a LEO/user code time of arrival $\tau^k_u$ for the LEO satellite signal 16 from the LEO satellite 14 denoted "k" to the GPS user receiver 20 denoted "u" equals the pseudorange $(|r^k_u| + b_u^{LEO} - B^k)$ (Eq. 12); plus the ionospheric delay $D^k_u$ (Eq. 12a); plus the measurement noise $v^k_u$ (Eq. 12a).

As shown in the pairs of equations 3a and 4a, 5a and 6a, 7a and 8a, 9a and 10a, and 23 and 24, the ionospheric delay D has an equal and opposite effect on code times of arrival and the carrier phases. By tracking the divergence of the code times of arrival and the carrier phases for the LEO satellite signal 16, the GPS user receiver 20 can derive parameters for an ionospheric model i. Optionally, the parameters may be derived in the GPS reference receiver 22 and included in the reference data issued in the step 304.

The double difference matrix equations 18 and 21 are re-written as equations 18a and 21a, respectively, to include the ionospheric model i and a geometric conversion factor C for relating the parameters of the ionospheric model i to the double difference carrier phases.

$$\begin{bmatrix} \nabla\Delta\Phi(t_1)^{g1,g2} \\ \nabla\Delta\Phi(t_1)^{g1,g3} \\ \vdots \\ \nabla\Delta\Phi(t_1)^{g1,gG} \\ \nabla\Delta\Phi(t_1)^{k1,k2} \\ \nabla\Delta\Phi(t_1)^{k1,k3} \\ \vdots \\ \nabla\Delta\Phi(t_1)^{k1,kK} \end{bmatrix} = \begin{bmatrix} \Delta l(t_1)^{g1,g2} \\ \Delta l(t_1)^{g1,g3} \\ \vdots \\ \Delta l(t_1)^{g1,gG} \\ \Delta l(t_1)^{k1,k2} \\ \Delta l(t_1)^{k1,k3} \\ \vdots \\ \Delta l(t_1)^{k1,kK} \end{bmatrix} \begin{bmatrix} r(t_1)_{u,m} \\ I \quad C \end{bmatrix} \begin{bmatrix} \nabla\Delta N^{g1,g2} \\ \nabla\Delta N^{g1,g3} \\ \vdots \\ \nabla\Delta N^{g1,gG} \\ \nabla\Delta N^{k1,k2} \\ \nabla\Delta N^{k1,k3} \\ \vdots \\ \nabla\Delta N^{k1,kK} \\ i \end{bmatrix} + \begin{bmatrix} \nabla\Delta vp(t_1)^{g1,g2} \\ \nabla\Delta vp(t_1)^{g1,g3} \\ \vdots \\ \nabla\Delta vp(t_1)^{g1,gG} \\ \nabla\Delta vp(t_1)^{k1,k2} \\ \nabla\Delta vp(t_1)^{k1,k3} \\ \vdots \\ \nabla\Delta vp(t_1)^{k1,kK} \end{bmatrix} \quad (18a)$$

$$\begin{bmatrix} \nabla\Delta\Phi(t_1)^{g1,g2} \\ \nabla\Delta\Phi(t_1)^{g1,g3} \\ \vdots \\ \nabla\Delta\Phi(t_1)^{g1,gG} \\ \nabla\Delta\Phi(t_1)^{g1,k1} \\ \nabla\Delta\Phi(t_1)^{g1,k2} \\ \vdots \\ \nabla\Delta\Phi(t_1)^{g1,kK} \end{bmatrix} = \begin{bmatrix} \Delta l(t_1)^{g1,g2} \\ \Delta l(t_1)^{g1,g3} \\ \vdots \\ \Delta l(t_1)^{g1,gG} \\ \Delta l(t_1)^{g1,k1} \\ \Delta l(t_1)^{g1,k2} \\ \vdots \\ \Delta l(t_1)^{g1,kK} \end{bmatrix} \begin{bmatrix} r(t_1)_{u,m} \\ I \quad C \end{bmatrix} \begin{bmatrix} \nabla\Delta N^{g1,g2} \\ \nabla\Delta N^{g1,g3} \\ \vdots \\ \nabla\Delta N^{g1,gG} \\ \Delta b_{u,m}^{GPS,LEO} + \nabla\Delta N^{g1,k1} \\ \Delta b_{u,m}^{GPS,LEO} + \nabla\Delta N^{g1,k2} \\ \vdots \\ \Delta b_{u,m}^{GPS,LEO} + \nabla\Delta N^{k1,kK} \\ i \end{bmatrix} + \begin{bmatrix} \nabla\Delta vp(t_1)^{g1,g2} \\ \nabla\Delta vp(t_1)^{g1,g3} \\ \vdots \\ \nabla\Delta vp(t_1)^{g1,gG} \\ \nabla\Delta vp(t_1)^{g1,k1} \\ \nabla\Delta vp(t_1)^{g1,k2} \\ \vdots \\ \nabla\Delta vp(t_1)^{g1,kK} \end{bmatrix} \quad (21a)$$

The equations 18a and 21a include the parameters for the ionospheric model i as a function of variables such as elevation, azimuth, and time; and the geometric conversion factor C to convert the ionospheric model i to the GPS and cross double differences. Several versions of the ionospheric model i of varying levels of complexity may be used. A simple version of the ionospheric model i may consist of a single parameter, such as ionospheric delay in the zenith direction. An intermediate version having several parameters has been described by J. Klobuchar at the 1986 Position and Location Symposium held in Las Vegas, Nev. from November 4 to November 7 in a paper entitled "Design and Characteristics of the GPS Ionospheric Time Delay Algorithm for Single Frequency Users". Copies of the paper may be obtained from the IEEE PLANS 1986 order department in Piscataway, N.J. A more complex version may include a spherical harmonic expansion and have an appearance of a sphere having undulations. For a case where the ionospheric model i consists of a single term of the ionospheric delay in the zenith direction, the geometric conversion factor C is a column matrix in terms of an elevation e. Equations 25 and 26 describe the geometric conversion factor C for the equations 18a and 21a, respectively.

$$C = \begin{bmatrix} 1/\mathrm{Cose}^{g1}{}_m - 1/\mathrm{Cose}^{g2}{}_m - 1/\mathrm{Cose}^{g1}{}_u + 1/\mathrm{Cose}^{g2}{}_u \\ 1/\mathrm{Cose}^{g1}{}_m - 1/\mathrm{Cose}^{g3}{}_m - 1/\mathrm{Cose}^{g1}{}_u + 1/\mathrm{Cose}^{g3}{}_u \\ \ldots \\ 1/\mathrm{Cose}^{g1}{}_m - 1/\mathrm{Cose}^{gG}{}_m - 1/\mathrm{Cose}^{g1}{}_u + 1/\mathrm{Cose}^{gG}{}_u \\ 1/\mathrm{Cose}^{k1}{}_m - 1/\mathrm{Cose}^{k2}{}_m - 1/\mathrm{Cose}^{k1}{}_u + 1/\mathrm{Cose}^{k2}{}_u \\ 1/\mathrm{Cose}^{k1}{}_m - 1/\mathrm{Cose}^{k3}{}_m - 1/\mathrm{Cose}^{k1}{}_u + 1/\mathrm{Cose}^{k3}{}_u \\ \ldots \\ 1/\mathrm{Cose}^{k1}{}_m - 1/\mathrm{Cose}^{kK}{}_m - 1/\mathrm{Cose}^{k1}{}_u + 1/\mathrm{Cose}^{kK}{}_u \end{bmatrix} \quad (25)$$

$$C = \begin{bmatrix} 1/\mathrm{Cose}^{g1}{}_m - 1/\mathrm{Cose}^{g2}{}_m - 1/\mathrm{Cose}^{g1}{}_u + 1/\mathrm{Cose}^{g2}{}_u \\ 1/\mathrm{Cose}^{g1}{}_m - 1/\mathrm{Cose}^{g3}{}_m - 1/\mathrm{Cose}^{g1}{}_u + 1/\mathrm{Cose}^{g3}{}_u \\ \ldots \\ 1/\mathrm{Cose}^{g1}{}_m - 1/\mathrm{Cose}^{gG}{}_m - 1/\mathrm{Cose}^{g1}{}_u + 1/\mathrm{Cose}^{gG}{}_u \\ 1/\mathrm{Cose}^{g1}{}_m - 1/\mathrm{Cose}^{k1}{}_m - 1/\mathrm{Cose}^{g1}{}_u + 1/\mathrm{Cose}^{k1}{}_u \\ 1/\mathrm{Cose}^{g1}{}_m - 1/\mathrm{Cose}^{k2}{}_m - 1/\mathrm{Cose}^{g1}{}_u + 1/\mathrm{Cose}^{k3}{}_u \\ \ldots \\ 1/\mathrm{Cose}^{g1}{}_m - 1/\mathrm{Cose}^{kK}{}_m - 1/\mathrm{Cose}^{g1}{}_u + 1/\mathrm{Cose}^{kK}{}_u \end{bmatrix} \quad (26)$$

In the equations 25 and 26 a superscript g1 to gG refers to the g1 to gG GPS satellite 12 and a superscript k1 to kK refers to the k1 to kK LEO satellite 14. A subscript m refers to the GPS reference receiver 22 and a subscript u refers to the GPS user receiver 20. As an example an angle $e^{g1}{}_m$ refers to an angle from the Zenith for the g1 GPS satellite 12 to the GPS reference receiver 22. To compute the location vector $r_{u,m}$ the carrier phase double differences of the equations 18a and 21a are triple differenced as described above.

In the step 304, the reference data optionally includes the parameters for the ionospheric model i that have been computed in the GPS reference receiver 22. Then, in the step 306, the LEO satellite 14 broadcasts the parameters to the GPS user receiver 20 and/or other receivers.

Although the present invention is described in terms of methods using double and triple differences to solve for the location vector $r_{u,m}$, single difference techniques which retain the GPS and LEO delay differences $\Delta b_{u,m}{}^{GPS}$ and $\Delta b_{u,m}{}^{LEO}$ and the wavelength differences $\Delta N^g{}_{u,m} \lambda^{GPS}$ and $\Delta N^k{}_{u,m} \lambda^{GPS}$ with the location vector $r_{u,m}$ in a vector of unknowns could be used. Such techniques are well-known to those skilled in the field of differential carrier phase measurements for precise positioning and are not repeated herein.

FIG. 4a illustrates a flow chart of a method for calibrating the GPS user receiver 20 for the LEO measurement delay $b_u{}^{LEO}$ and the GPS measurement delay $b_u{}^{GPS}$ in the RF section 40 (FIGS. 2a). The same method can be used for calibrating the GPS reference receiver 22. In a step 400 during the design or manufacture, the cross user delay $b_u{}^{GPS,LEO}$ of the GPS user receiver 20 at the GPS frequency $f_{L2}$ and/or $f_{L1}$ is pre-determined either by analysis of the hardware or testing with equipment such as a Network Analyzer. In a step 402 during the design or manufacture, the temperature characteristic of the cross user delay $b_u{}^{GPS,LEO}$ is pre-determined either by analysis of the temperature coefficients of the hardware or by testing at several temperatures. Alternatively, the hardware may be designed to reduce the temperature characteristic to a level that is tolerable for the required accuracy of the measurements of the GPS carrier phase. In a step 404 the cross user delay $b_u{}^{GPS,LEO}$ is stored in the memory 48 (FIG. 2a). In a step 406 the temperature characteristic of the cross user delay $b_u{}^{GPS,LEO}$ is stored in the memory 48 (FIG. 2a). In a step 408 when the GPS user receiver 20 is operating, the temperature sensor 50 (FIG. 2a) measures a current temperature of the RF section 40 (FIG. 2a). In a step 410 the cross delay difference $b_u{}^{GPS,LEO}$ is determined for the temperature of operation.

FIG. 4b illustrates a flow chart of a method for calibrating the GPS user receiver 20 for the LEO measurement delay $b_u{}^{LEO}$ and the GPS measurement delay $b_u{}^{GPS}$ in the RF section 60 (FIG. 2b). The same method can be used for calibrating the GPS reference receiver 22. In a step 430 a GPS simulation signal corresponding to the GPS satellite signal 18 is generated by the signal simulator 74 and coupled into the GPS antenna 68 (FIG. 2b). In a step 432 a first simulated GPS carrier phase is determined for the GPS simulated signal that is coupled into the GPS antenna 68 (FIG. 2b) and a second simulated GPS carrier phase is determined for the GPS simulated signal that has passed through the GPS downconverter 70 (FIG. 2b). In a step 434 the first and the second simulated carrier phases are compared and the GPS measurement delay $b_u{}^{GPS}$ is determined.

In a step 436 a LEO simulation signal corresponding to the LEO satellite signal 16 is generated by the signal simulator 74 and coupled into the LEO antenna 64 (FIG. 2b). In a step 438 a first simulated LEO carrier phase is determined for the LEO simulated signal that is coupled into the LEO antenna 64 (FIG. 2b) and a second simulated LEO carrier phase is determined for the LEO simulated signal that has passed through the LEO downconverter 66 (FIG. 2b). In a step 440 the first and the second simulated carrier phases are compared and the LEO measurement delay $b_u{}^{LEO}$ is determined. In a step 442 the cross delay difference $b_u{}^{GPS,LEO}$ is determined from a difference between the GPS measurement delay $b_u{}^{GPS}$ and the LEO measurement delay $b_u{}^{LEO}$.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver system, comprising:
   a first receiver for determining a first global positioning system (GPS) carrier phase from a GPS signal, determining a first low Earth orbiting (LEO) carrier phase from a LEO satellite signal, and issuing information for said first GPS carrier phase and said first LEO carrier phase in an output signal; and
   a second receiver for receiving said output signal, determining a second GPS carrier phase from said GPS signal and a second LEO carrier phase from said LEO satellite signal, and computing a location vector between a geographical location of the first receiver and a geographical location of the second receiver based upon differences between said first and said second GPS carrier phase and said first and said second LEO carrier phase.

2. A receiver system, comprising:

a first receiver for determining a first global orbiting navigational system (GLONASS) carrier phase from a GLONASS signal, determining a first low Earth orbiting (LEO) carrier phase from a LEO satellite signal, and issuing information for said first GLONASS carrier phase and said first LEO carrier phase in an output signal; and a second receiver for receiving said output signal, determining a second GLONASS carrier phase from said GLONASS signal and a second LEO carrier phase from said LEO satellite signal, and computing a location vector between a geographical location of the first receiver and a geographical location of the second receiver based upon differences between said first and said second GLONASS carrier phase and said first and said second LEO carrier phase.

3. A method for computing a location vector between a reference receiver and a user receiver, comprising steps of:

determining at least one global positioning system (GPS)/reference carrier phase with said reference receiver from a GPS signal;

determining at least one low Earth orbiting (LEO)/reference carrier phase with said reference receiver from a LEO satellite signal;

issuing information for said at least one GPS/reference carrier phase and said at least one LEO/reference carrier phase in an output signal from said reference receiver;

receiving said output signal with said user receiver;

determining at least one GPS/user carrier phase with said second receiver from said GPS signal;

determining at least one LEO/user carrier phase with said user receiver from said LEO satellite signal; and computing said location vector between a geographical location of said reference receiver and a geographical location of said user receiver based upon at least one GPS phase difference between said at least one GPS/reference carrier phase and said at least one GPS/user carrier phase and at least one LEO phase difference between said at least one LEO/reference carrier phase and said at least one LEO/user carrier phase.

4. The method of claim 3, wherein:

the step of computing said location vector includes steps of: calculating at least one GPS double difference for a difference between one said GPS phase difference and at least one other said GPS phase difference; calculating at least one cross double difference for a difference between said one GPS phase difference and at least one LEO phase difference; and calculating said location vector further based upon said at least one GPS double difference and said at least one cross double difference.

5. The method of claim 4, further including steps of:

determining a cross reference delay in said reference receiver between a reference GPS measurement delay and a reference LEO measurement delay by using test signals;

determining a cross user delay in said user receiver between a user GPS measurement delay and a user LEO measurement delay by using test signals; and wherein:

said step of calculating said at least one cross double difference includes differencing said cross reference delay and said cross user delay.

6. The method of claim 4, wherein:

said step of calculating said at least one cross double difference includes a step of combining effects of a cross delay difference for (i) a GPS measurement delay in said reference receiver, (ii) a LEO measurement delay in said reference receiver, (iii) a GPS measurement delay in said user receiver, and (iv) a LEO measurement delay in said user receiver with effects of a cross wavelength double difference for (i) said GPS signal transmission to said reference receiver, (ii) said LEO signal transmission to said reference receiver, (iii) said GPS signal transmission to said user receiver, and (iv) said LEO signal transmission to said user receiver; and the step of computing said location vector includes a step of resolving said combined effects by calculating a triple difference for a difference between said at least one GPS double difference at a first time and at a second time and between said at least one cross double difference at said first time and at said second time.

7. A location system, comprising:

a reference receiver for determining at least one global positioning system (GPS)/reference carrier phase from a GPS signal, determining at least one low Earth orbiting (LEO)/reference carrier phase from a LEO satellite signal, and issuing information for said at least one GPS/reference carrier phase and said at least one LEO/reference carrier phase in an output signal; and a user receiver for receiving said output signal with said user receiver; determining at least one GPS/user carrier phase from said GPS signal, determining at least one LEO/user carrier phase from said LEO satellite signal, and computing a location vector between a geographical location of said reference receiver and a geographical location of said user receiver based upon at least one GPS phase difference between said at least one GPS/reference carrier phase and said at least one GPS/user carrier phase and at least one LEO phase difference between said at least one LEO/reference carrier phase and said at least one LEO/user carrier phase.

8. The system of claim 7, wherein:

the user receiver is further for calculating at least one GPS double difference for a difference between one said GPS phase difference and at least one other said GPS phase difference, calculating at least one cross double difference for a difference between said one GPS phase difference and said at least one LEO phase difference, and calculating said location vector further based upon said at least one GPS double difference and said at least one cross double difference.

9. The system of claim 8, wherein:

the user receiver is further for calculating said at least one cross double difference by calculating a difference between (i) a cross user delay for a difference between a user GPS measurement delay and a user LEO measurement delay and (ii) a cross reference delay for a difference between a reference GPS measurement delay and a reference LEO measurement delay.

10. The system of claim 8, wherein:

the user receiver is further for calculating said at least one cross double difference by combining effects of a cross delay difference for (i) a GPS measurement delay in said reference receiver, (ii) a LEO measurement delay in said reference receiver, (iii) a GPS measurement delay in said user receiver, and (iv) a LEO measurement delay in said user receiver with effects of a cross wavelength double difference for (i) said GPS signal transmission to said reference receiver, (ii) said LEO signal transmission to said reference receiver, (iii) said GPS signal transmission to said user receiver, and (iv) said LEO signal transmission to said user receiver; and resolving said combined effects by calculating a triple difference for a difference between said at least one GPS double difference at a first time and at a second time and between said at least one cross double difference at said first time and at said second time.

* * * * *